United States Patent
Metral

(10) Patent No.: US 11,087,320 B2
(45) Date of Patent: *Aug. 10, 2021

(54) SPLIT PATH DATA COMMUNICATION

(71) Applicant: PAYPAL, INC., San Jose, CA (US)

(72) Inventor: Max Edward Metral, Brookline, MA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/659,356

(22) Filed: Oct. 21, 2019

(65) Prior Publication Data

US 2020/0118126 A1 Apr. 16, 2020

Related U.S. Application Data

(63) Continuation of application No. 14/745,168, filed on Jun. 19, 2015, now Pat. No. 10,453,057.

(51) Int. Cl.
*G06Q 20/40* (2012.01)
*G06Q 20/38* (2012.01)
(Continued)

(52) U.S. Cl.
CPC ........... *G06Q 20/40* (2013.01); *G06Q 20/206* (2013.01); *G06Q 20/382* (2013.01); *G06Q 20/425* (2013.01)

(58) Field of Classification Search
CPC .... G06Q 20/40; G06Q 20/206; G06Q 20/382; G06Q 20/425

(Continued)

(56) References Cited

U.S. PATENT DOCUMENTS 7,349,871 B2 * 3/2008 Labrou .................. G06Q 20/02
705/26.35
8,750,901 B1 * 6/2014 Gupta .................... G06Q 20/42
455/456.3

(Continued)

OTHER PUBLICATIONS

Title:Secure E-Commerce Transactions for Multicast Services Author: Anil Kumar Venkataiahgari, J. William Atwood, Mourad Debbabi Publisher: IEEE pp. 8 (Year: 2006).*

*Primary Examiner* — Christopher Bridges
*Assistant Examiner* — Yongsik Park
(74) *Attorney, Agent, or Firm* — Haynes and Boone, LLP

(57) ABSTRACT

A system, a medium, and a method are provided to split data paths among various devices in data communications system. In some instances, the server device receives a request from a remote device such as a website server or a checkout device, where the request indicates a user request to purchase one or more items. An account management component of the server device determines a user account associated with the user request and identifies a user device associated with the user account, such as the user's smartphone. An authentication component of the server device generates an electronic message that indicates that the user must authenticate the request such that the request may be processed and initiates a transmittal of the electronic message to the user's smartphone. The user may accept or authenticate the request to process the request. As such, a communication interface of the server device may receive user data from the user's smartphone in response to the transmittal of the electronic message, possibly to process the request.

20 Claims, 13 Drawing Sheets

(51) Int. Cl.
*G06Q 20/20* (2012.01)
*G06Q 20/42* (2012.01)

(58) Field of Classification Search
USPC .......................................................... 705/44
See application file for complete search history.

(56) References Cited

U.S. PATENT DOCUMENTS

| | | | |
|---|---|---|---|
| 9,111,274 B2 * | 8/2015 | Wikander | G06Q 20/20 |
| 2003/0051138 A1 * | 3/2003 | Maeda | H04L 63/0861 713/168 |
| 2007/0084913 A1 * | 4/2007 | Weston | G06Q 20/3224 235/380 |
| 2010/0145850 A1 * | 6/2010 | Nagai | G06Q 20/363 705/41 |
| 2010/0312645 A1 * | 12/2010 | Niejadlik | G06Q 30/0257 705/14.55 |
| 2012/0310826 A1 * | 12/2012 | Chatterjee | G06Q 20/326 705/41 |
| 2013/0159173 A1 * | 6/2013 | Sivaraman | G06Q 20/322 705/39 |
| 2015/0073959 A1 * | 3/2015 | Connors | G06Q 40/00 705/35 |
| 2015/0100490 A1 * | 4/2015 | Agapitov | G06Q 20/425 705/44 |
| 2015/0294304 A1 * | 10/2015 | Donnellan | G06Q 20/3276 705/44 |

* cited by examiner

SPLIT PATH DATA COMMUNICATION

CROSS-REFERENCE TO RELATED APPLICATIONS

This application is a continuation of U.S. patent application Ser. No. 14/745,168, filed Jun. 19, 2015, which is herein incorporated by reference in its entirety.

TECHNICAL FIELD

This disclosure generally relates to a server device and multiple client or remote devices electronically communicating data, and more particularly, to exchanging data using split path data communications.

BACKGROUND

With various types of computing devices such as desktop computers, laptop computers, tablet computers, and/or smartphones becoming increasingly more prevalent in the modern world, it is common for individuals to use multiple computing devices as part of their daily lives. For example, smartphones may be used to purchase items through online websites. Some consumers may provide credit card information through their smartphones to purchase the items. Further, some consumers may provide such information in merchant stores to make in-store purchases. For example, the merchant stores may have a number of point-of-sale (POS) devices or checkout devices that receive the information to perform numerous transactions throughout the day. In some instances, the ability to make purchases in various such ways may be convenient, possibly enabling consumers to purchase items from virtually any location.

Yet, a number of issues may also arise with using multiple ways to purchase items. In some instances, it might be inconvenient or inefficient for a given user to provide credit card information to multiple online websites and/or checkout devices each time the user wishes to purchase an item. For example, a given user may have to create a login or enter login information for each of the websites, enter the credit card information, and/or validate the information each time the user wishes to make a purchase. Furthermore, at each merchant store, the user may be required to swipe the credit card through a checkout device, prove rightful ownership of the credit card by providing a separate identification card, and/or provide a valid signature on a merchant receipt to complete the purchases. As such, the user may be required to take a number of steps to complete a simple purchase.

Furthermore, consumers providing their credit card information to multiple merchant websites and/or devices such as POS devices, checkout devices, kiosks, and/or other merchant devices may be subject to undesirable security risks. For example, entering or re-entering sensitive confidential information may increase risks, where the websites and/or the checkout devices receiving such information may be susceptible to potential interceptors. Consider the scenarios above where a user wishes to purchase an item through a website and provides the credit card information. In such instances, risks may be increased as the user makes additional purchases from various other websites and provides the information to each of the websites. The increased exposure of the information to potential interceptors is generally undesirable to user. Even if the actual security risk is minimal or non-existent, consumers may be reluctant to provide payment information to a merchant, such as through a merchant website, due to the perceived security risks.

Thus, there is much need for technological improvements to avert the inconveniences and/or inefficiencies associated with entering sensitive information into merchant websites and/or devices. In addition, there is much need for improvements in maintaining or ensuring the security with using such devices.

Figure 1:
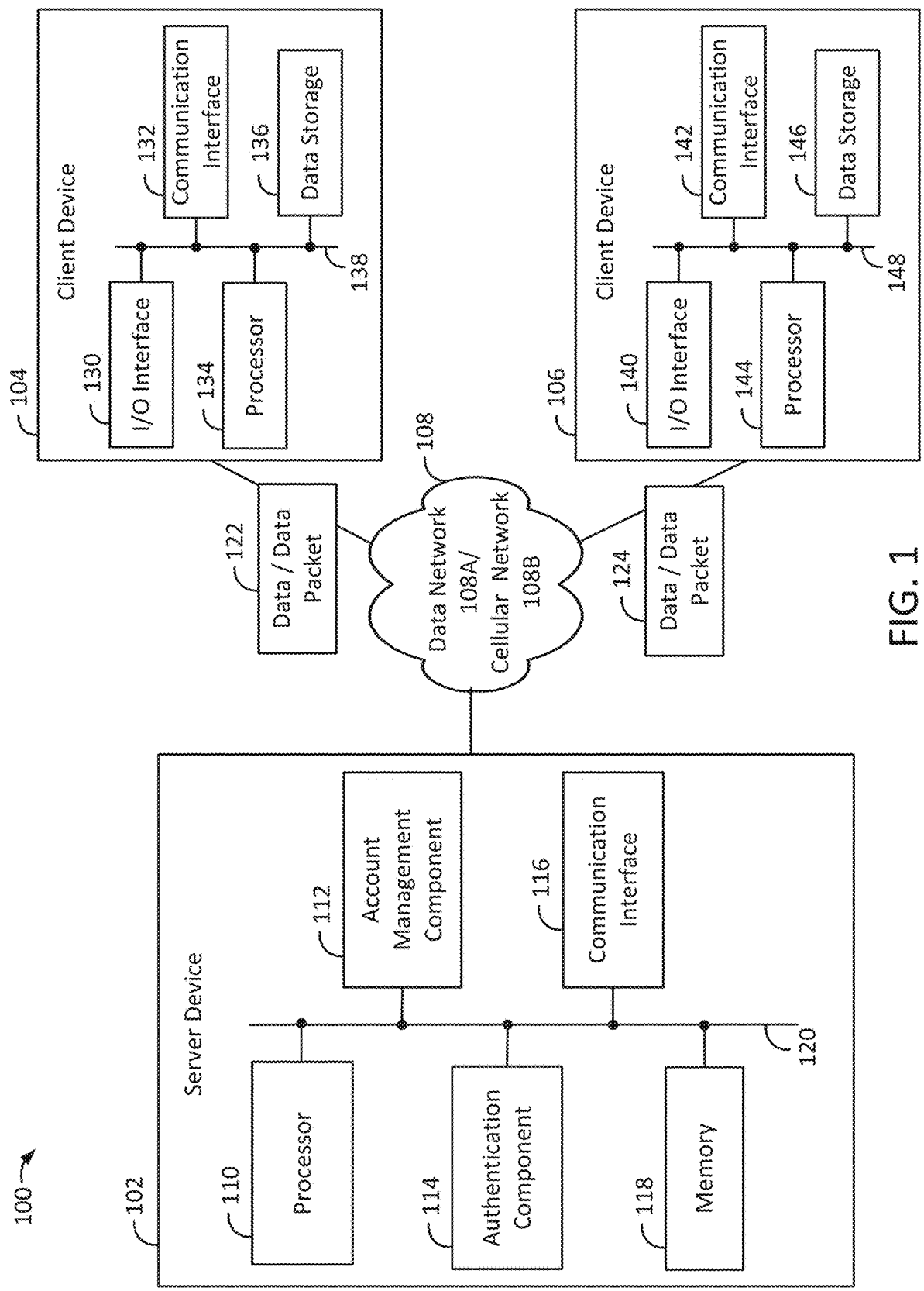
FIG. 1 is a block diagram of an exemplary system, according to an embodiment.

Embodiments of the present disclosure and their advantages may be understood by referring to the detailed description that follows. It should be appreciated that like reference numerals are used to identify elements illustrated in one or more of the figures, where the figures illustrate various examples for purposes of illustration and explanation related to the embodiments of the present disclosure and not for purposes of limitation.

DETAILED DESCRIPTION

Example embodiments herein describe a split path data communication system to reduce inconveniences and/or inefficiencies with users having to provide information to merchant websites and/or devices (e.g., POS devices). Further, the system may also maintain or increase security levels of confidential or sensitive information. For example, consider the above scenario where a user wishes to purchase one or more items through a merchant website. "Items" as used herein may include, but are not limited to, goods or tangible goods, services or amenities, and/or digital goods, devices, and/or multimedia. As noted, the user may have to provide the required information by entering a credit card number through the website and possibly proving ownership of the credit card to make the purchase, e.g., by providing additional security numbers on the back of the card. Yet, instead of the user carrying out these steps to manually provide such information, the user may have the information accessible through the user's smartphone, possibly stored under the user's account with a payment provider such as, for example, PayPal, Inc. of San Jose, Calif., USA. Thus, the path to checkout between the user and the website may be split to include the payment provider, among various other possibilities. For example, the payment provider may be an interface between the user's smartphone and the server that runs the website. Further, the user's device and/or the server that runs the website may communicate with the payment provider to complete purchases for the user.

In one example, the user may simply provide a phone number of a payer, which might be the user or another user (such as a relative), to the merchant website and the website may send the user's request to purchase the items to the payment provider. In particular, the website's server may call the application programming interface (API) on the payment provider's server including details of the user's request. As such, the payment provider may verify the request and send an electronic message, e.g., a push notification, a text message, a Short Message Service (SMS), an email, and/or a uniform resource locator (URL) link, to the payer's smartphone. In some instances, the message may open up in the payment provider's mobile app accessible through the payer's smartphone. Once the mobile app is opened, the payer may simply authorize a payment to purchase the items, such as by tapping or selecting a button and/or authenticating a payment (if needed), such as by entering biometric data and/or a PIN/password. The amount of the payment may be indicated in the message and/or in the opened app. Upon authorization of the payment (or if the payment is declined), notifications may be sent to the payer accordingly. For example, the payer may be notified through the website and/or the app that initiated the transaction, and/or the payer may be notified, such as through the payment provider's mobile app. Further, the electronic message may include a link to the payer's account with the payment provider. Yet further, the electronic message may indicate that the payer must accept or authenticate the request through the smartphone to purchase the items.

In some instances, the payer may accept the request by making an indication to purchase the items through the payer's smartphone. The payer may simply make the indication by pressing an "accept" button provided in the message. Yet, in some instances, the payer may have to enter a PIN number, a zip code, an email address, and/or a phone number to accept or authenticate the purchase. Further, the payer may accept or authenticate the request by providing additional inputs such as a fingerprint input, an eye, retinal, and/or iris scan input, a pulse measurement input, among other possible biometric inputs. By accepting or authenticating the request in such ways, the payment provider may process the purchase by pulling the required funds from the payer's account and initiating a fund transfer with the merchant to complete or process the purchase. In some instances, the payment provider may process the purchase using credit card information stored under the payer's account.

By eliminating the requirement for manually entering or providing the information to merchant websites and/or merchant checkout devices, the sensitive or confidential information may be exchanged by trusted devices (e.g., the payer's smartphone and/or the payment provider's server) to facilitate the security of the information and the exchange of the information. As such, in addition to eliminating inconveniences associated with manually entering information, the information may be secured away from potential interceptors attempting to obtain the information provided manually to websites and/or checkout devices. In some instances, the payer may have the option to provide the requisite credit card information to websites and/or checkout devices directly. For example, for in-store purchases, the smartphone may provide the information to checkout device through secure Near Field Communication (NFC) protocols and/or secure short-range, point-to-multipoint transfer communication interfaces, such as BLUETOOTH.

FIG. 1 is a block diagram of an example system 100, according to an embodiment. As shown, the system 100 includes multiple computing devices, such as a server device 102, a client device 104, and a client device 106, among other possible computing devices. The server device 102 may be configured to support, operate, and/or manage numerous user accounts. The system 100 may operate with more or less computing devices than those shown in FIG. 1, where each device may be configured to communicate over a communication network 108. As shown, the communication network 108 may include a data network 108A and a cellular network 108B. Thus, the server device 102, the client device 104, and/or the client device 106 may each be configured to communicate over the communication network 108.

The server device 102, possibly a network and/or a web server, may be configured to perform various operations in accordance with this disclosure and the accompanying figures. In some embodiments, the server device 102 may be configured to access or receive a request (e.g., a client request), e.g., data/data packet 122, from the client device 104, where the request indicates a user request to purchase one or more items. As such, the server device 102 may determine a user account indicated with the user request. For example, the server device 102 may determine the request indicates a user account number, a phone number, an email account, and/or another indicator to identify the user account. Further, the server device may determine the client device 106 associated with the user account. Further, the server device 102 may also determine or identify multiple other user devices associated with the account. For example, the server device 102 may determine or identify a smartphone, a laptop, a tablet computer, a wearable computing device, a head-mountable display, a smart watch, and/or other devices associated with the user account, e.g., registered under the user account and/or owned or possessed by the user. The data packets 122 and 124 may be accessible via protocols such as Transmission Control Protocol/Internet Protocol (TCP/IP). In various embodiments, each of the packets 122 and 124 may include 1,000 to 1,500 bytes, among other possible data ranges.

The server device 102 may generate an electronic message indicating that the user must authenticate the user request to process the purchase of the one or more items under the user account. Further, the server device 102 may transmit the electronic message, e.g., the data/data packet 124, to the user device 106. As such, the user may view the transmitted electronic message and authenticate the user request to process the purchase of the one or more items. As noted, the user may simply provide an indication to "accept" the user request to process the purchase. Yet, in some instances, the user may provide or enter a PIN number, a password, a code, and/or an encryption key via the user device 106 to authenticate the user request. Further, the user may provide a biometric input, e.g., a fingerprint input, an eye scan, and/or a pulse measurement, to the user device 106 to authenticate the user request. Thus, by localizing or limiting the entry of such confidential or sensitive data to a single trusted device, e.g., the user device 106, the security of the data may be maintained. Note that as used herein, "user" can refer to the user initiating the transaction or payment, or the user paying for the transaction, which can be the same user or a different user. As noted, the user paying for the transaction may be referred to as the "payer."

In some embodiments, the server device 102 may take a variety of forms. The server device 102 may take the form of a stand-alone and/or an enterprise-class server device, and/or a server device implementing one or more operating systems such as client- and/or server-based operating systems. Further, the server device 102 may include multiple components, including, for example, a processor 110, an account management component 112, an authentication component 114, a communication interface 116, and a memory 118, any of which may be communicatively linked via a system bus, network, or other connection mechanism 120.

The processor 110 may take the form of a multi-purpose processor, a microprocessor, and/or a special purpose processor. The account management component 112 and/or the authentication component 114 may also take the form of a multi-purpose, a microprocessor, and/or a special purpose processor, a digital signal processor (DSP), an application specific integrated circuit (ASIC), a programmable system on chip (PSOC), field-programmable gate array (FPGA), and/or other types of processing components. For example, the processor 110 may process the request received from the client device 104 to determine, read, and/or parse the user request to purchase the one or more items. The account management component 112, possibly an account database engine, may determine the user account associated with the user request and determine the one or more user devices, e.g., the client device 106, associated with the user account. Further, the authentication component 114 may generate the electronic messages to indicate requests or requirements to approve authenticate user requests and initiate the server device 102 to transmit the electronic messages to the client device 106.

The communication interface 116 may take a variety of forms and may be configured to allow the server device 102 to communicate with one or more devices according to a number of protocols. For example, the communication interface 116 may include a transceiver that enables the server device 102 to communicate with the client devices 104 and/or 106 via the communication network 108. Further, the communication interface 116 may take the form of a wired interface, such as an Ethernet interface. Yet further, the communication interface 116 may take the form of a wireless interface, such as a cellular or microcell interface, a WI-FI interface, another short-range, point-to-multipoint voice and/or data transfer communication interface, such as BLUETOOTH. In some instances, the communication interface 116 may send/receive data to/from client devices 104 and/or 106.

The memory 118 may include one or more of volatile, non-volatile, and/or replaceable storage components, such as magnetic, optical, or flash storage, and may be integrated in whole or in part with the processor 110, the account management component 112, and/or the authentication component 114. Further, the memory 118 may include or take the form of a non-transitory computer-readable storage medium, having stored thereon computer-readable instructions (e.g., compiled or non-compiled program logic and/or machine code) that, when executed by the server device 102, cause the server device 102 to perform operations, such as those described in this disclosure and illustrated by the accompanying figures.

The client devices 104 and 106, possibly also referred to as remote devices, may also be configured to perform a variety of operations such as those described in this disclosure and illustrated by the accompanying figures. For example, client devices 104 and 106 may be configured to exchange data/data packets 122 and/or 124 with the server device 102, that include one or more requests, user requests and/or related data, user account data, purchasing or transactional data, item identification or description data, user device data, electronic messages and/or related data, requirement data, authentication data, biometric data, user data received in response to electronic messages, and/or other types of data described above. Client devices 104 and 106 may take a variety of forms, including, for example, a personal computer (PC), a smartphone, a wearable computer, a laptop/tablet computer, a merchant device, a smart watch, a head-mountable display, other types of wearable devices, and/or other types of computing devices configured to transmit and/or receive data, among other possibilities.

The client devices 104 and 106 may include various components, including, for example, input/output (I/O) interfaces 130 and 140, communication interfaces 132 and 142, processors 134 and 144, and data storages 136 and 146, respectively, all of which may be communicatively linked with each other via a system bus, network, or other connection mechanisms 138 and 148, respectively.

The I/O interfaces 130 and 140 may be configured to receive inputs from (and provide outputs to) one or more users of the client devices 104 and 106. For example, the I/O interface 140 may enable a user to access an account via the client device 106. Thus, the I/O interfaces 130 and 140 may include input hardware such as a touchscreen with one or more surfaces, a touch sensitive panel with one or more panel surfaces, a microphone for receiving voice commands, a computer mouse, a keyboard, and/or other input hardware. In addition, I/O interfaces 130 and 140 may include output hardware such as displays possibly with touchscreen inputs, a sound speaker, other audio output mechanism, a haptic feedback system, and/or other output hardware.

In some embodiments, communication interfaces 132 and 142 may take a variety of forms and may be configured to allow client devices 104 and 106, respectively, to communicate with one or more devices according to a number of protocols. For instance, communication interfaces 132 and 142 may be configured to allow client devices 104 and 106, respectively, to communicate with the server device 102 via the communication network 108. The processors 134 and 144 may include multi-purpose processors and/or special purpose processors such as those described above. Data storages 136 and 146 may include one or more volatile, non-volatile, removable, and/or non-removable storage components, and may be integrated in whole or in part with processors 134 and 144, respectively. Further, data storages 136 and 146 may take the form of non-transitory computer-readable storage mediums, having stored thereon computer-readable instructions that, when executed by processors 134 and 144, cause client devices 104 and 106 to perform operations, respectively, such as those described in this disclosure and illustrated by the accompanying figures.

In some embodiments, the communication network 108 may exchange data among the server device 102, the client device 104, the client device 106, and/or other client or remote devices. The communication network 108 may be a packet-switched network configured to provide digital networking communications and/or exchange data of various forms, content, type, and/or structure. The communication network 108 may include a data network 108A with various sizes of communication networks, such as a private and/or local area networks and/or wide area networks or the Internet. Further, the communication network 108 may include a cellular network 108B with one or more base station networks of various sizes, possibly accessible by various devices 102, 104, and/or 106 within the system 100. The communication network 108 may include network adapters, switches, routers, network nodes, base stations, microcells, and/or various buffers/queues to exchange data/data packets 122 and/or 124.

For example, the communication network 108 may be configured to carry the first data packet 122 and the second data packet 124 including one or more requests, user requests and/or related data, user account data, purchase or transactional data, item or item description data, user device data, electronic messages and/or related data, requirement data, authentication data, biometric data, user data received in response to electronic messages, and/or other types of data described above. The communication network 108 may exchange such packets 122 and/or 124 between the server device 102, the client device 104, and/or the client device 106 using various protocols such as Transmission Control Protocol/Internet Protocol (TCP/IP), among other possibilities.

In some embodiments, the system 100 may include the server device 102 that receives a request (e.g., a client request) in data/data packet 122 from the client device 104, where the request indicates a user request to purchase one or more items. The account management component 112 of the server device 102 determines a user account associated with the user request to purchase the one or more items. Further, the account management component 112 determines a user device 106 associated with the user account. The authentication component 114 of the server device 102 generates an electronic message that indicates a request or requirement to approve or authenticate the user request to process the user request. Further, the authentication component 114 initiates a transmittal of the electronic message to the user device 106. A communication interface 116 of the server device 102 receives user data from the user device in response to the transmittal of the electronic message that indicates the request or requirement to approve or authenticate the user request.

It can be appreciated that the server device 102 and the client devices 104 and 106 illustrated in FIG. 1 may be deployed in other ways. The operations performed and/or the services provided by such client devices 104 and 106 may be combined or separated for a given embodiment and may be performed by a greater number or fewer number of devices. Further, one or more devices may be operated and/or maintained by the same or different entities.

In some embodiments, a user account, possibly also referred to simply as an account, may be a compilation of data associated with a user. As such, some examples of accounts may include accounts with service providers such as EBAY®, Inc. of San Jose, Calif., USA, and/or STUBHUB®, Inc. of San Francisco, Calif., and/or PayPal, Inc. of San Jose, Calif., USA, and/or other types of financial or e-commerce related accounts. Further, accounts may include social networking accounts, e-mail accounts, smartphone accounts, music playlist accounts, video streaming accounts, among other possibilities. For example, an account for a particular user may include data related to the user, data related to the user's interest, and/or data representing the user. Further, the user may provide various types of data to a user device with access to the account, such as requests to authenticate purchases.

The user account may be displayed on a computing device or a remote device, such as those described above in relation to FIG. 1. Thus, the user account may be displayed on a smartphone, a laptop computer, and/or a wearable computing device that may be used to access the account. The user may operate the computing device and their account may be managed on the computing device. For example, a computing device or a user device may be used to view and/or send one or more requests, user requests and/or related data, user account data, purchase or transactional data, item or item description data, user device data, electronic messages and/or related data, requirement data, authentication data, biometric data, user data received in response to electronic messages, and/or other types of data described above.

In some embodiments, a user may have a single account such as an account with a service or payment provider representing the user for multiple other accounts described above such as e-mail accounts, social networking accounts, smartphone accounts, as well as websites, applications, and/or other services. For example, a user could opt to use their account as a multi-purpose account for performing various operations, including initiating user requests to purchase one or more items and authenticating or verifying the user requests.

In some embodiments, a user account may be created by one or more users. For example, the account may be a family account where a number of family members or users may have access to the family account. As such, a daughter of the family may initiate a user request to purchase one or more clothing items and the system may transmit an electronic message to a parent inviting the parent to approve and process the daughter's request. In some instances, the account may be a corporate account, where employees, staff, worker personnel, and/or contractors, among other individuals may have access to the corporate account. Yet further, it should be noted that a user may be a computing device, a computing system, a robotic system, and/or another form of technology capable of sending and receiving data corresponding to the account. A user may be required to provide a login, a password, a code, an encryption key, authentication data, biometric data, and/or other types of data to gain access the account.

Figure 2A:
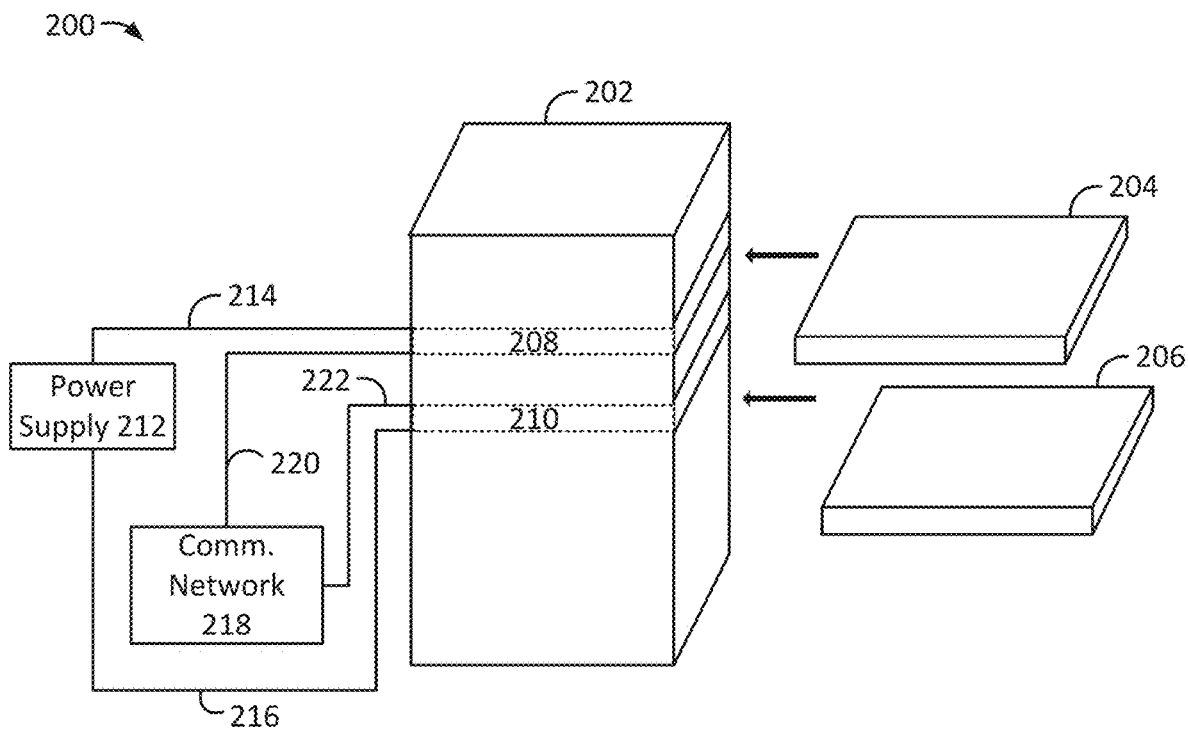
FIG. 2A illustrates an exemplary server device configured to support a set of trays, according to an embodiment.

FIG. 2A illustrates an exemplary server device 200 configured to support a set of trays, according to an embodiment. The server device 200 may, for example, take the form of the server device 102 described above in relation to FIG. 1. Further, the server device 200 may be configured to support, operate, run, and/or manage numerous user accounts and various types of data including one or more requests, user requests and/or related data, user account data, purchase or transactional data, and/or other types of data described above.

As shown, server device 200 may include a chassis 202 that may support trays 204 and 206, and possibly multiple other trays as well. The chassis 202 may include slots 208 and 210 configured to hold trays 204 and 206, respectively. For example, the tray 204 may be inserted into the slot 208 and the tray 206 may be inserted into the slot 210. Yet, the slots 208 and 210 may be configured to hold the trays 204 and 206 interchangeably such that the slot 208 may be configured to hold the tray 206 and the slot 210 may be configured to hold the tray 204. For example, during operation of server device 200, the tray 204 may be inserted into the slot 208 and the tray 206 may be inserted into the slot 210. Further, the trays 204 and 206 may be removed from the slots 208 and 210, respectively. Yet further, the tray 204 may be inserted into the slot 210 and the tray 206 may be inserted into the slot 208, and the server device 200 may continue operating without interruptions.

The chassis 202 may be connected to a power supply 212 via connections 214 and 216 to supply power to the slots 208 and 210, respectively. The chassis 202 may also be connected to the communication network 218 via connections 220 and 222 to provide network connectivity to the slots 208 and 210, respectively. As such, trays 204 and 206 may be inserted into slots 208 and 210, respectively, and power supply 212 may supply power to trays 204 and 206 via connections 214 and 216, respectively. Further, trays 204 and 206 may be inserted into slots 210 and 208, respectively, and power supply 212 may supply power to trays 204 and 206 via connections 216 and 214, respectively. Yet further, trays 204 and 206 may be inserted into slots 208 and 210, respectively, and communication network 218 may provide network connectivity to trays 204 and 206 via connections 220 and 222, respectively. In addition, trays 204 and 206 may be inserted into slots 210 and 208, respectively, and communication network 218 may provide network connectivity to trays 204 and 206 via connections 222 and 220, respectively.

The communication network 218 may, for example, take the form of communication network 108 described above in relation to FIG. 1, possibly including one or both of the data network 108A and the cellular network 108B. In some embodiments, the communication network 218 may provide a network port, a network hub, a network switch, or a network router that may be connected to an Ethernet link, an optical communication link, a telephone link, among other possibilities.

Figure 2B:
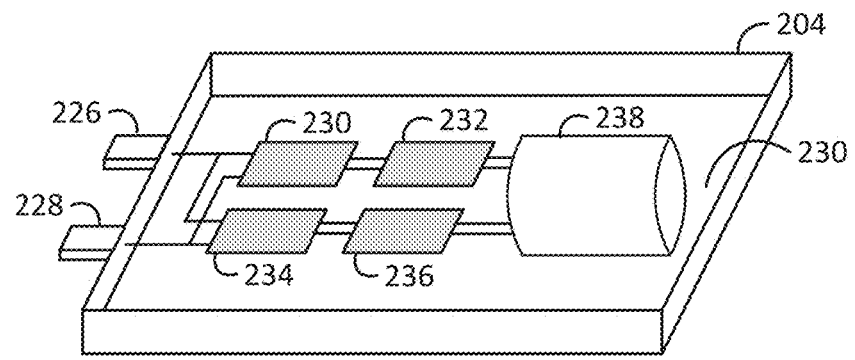
FIG. 2B illustrates an exemplary tray configured to support one or more components, according to an embodiment.

FIG. 2B illustrates an exemplary tray 204 configured to support one or more components, according to an embodiment. The tray 204 may, for example, take the form of tray 204 described in relation to FIG. 2A. Further, the tray 206 may also take the form of the tray 204. As shown, the tray 204 may include a tray base 230 as the bottom surface of the tray 204 configured to support multiple components such as a main computing board connecting one or more components 230-238. The tray 204 may include a connection 226 that may link to the connections 214 or 216 to supply power to the tray 204. The tray 204 may also include a connection 228 that may link to the connections 220 or 222 to provide network connectivity to the tray 204. The connections 226 and 228 may be positioned on the tray 204 such that upon inserting the tray 204 into the slot 208, the connections 226 and 228 couple directly with the connections 214 and 220, respectively. Further, upon inserting the tray 204 into the slot 210, the connections 226 and 228 may couple directly with connections 216 and 222, respectively.

The tray 204 may include components 230-238. In some instances, a processor 230, an account management component 232, an authentication component 234, a communication interface 236, and a memory 238 may, for example, take the form of the processor 110, the account management component 112, the authentication component 114, the communication interface 116, and the memory 118, respectively. As such, the connections 226 and 228 may be configured to provide power and network connectivity to each of the components 230-238. In some embodiments, one or more of the components 230-238 may be configured or supported via one or more circuits that include resistors, inductors, capacitors, voltage sources, current sources, switches, logic gates, registers, and/or a variety of other circuit components to perform operations described herein and illustrated by the accompanying figures. In some embodiments, the server 200 may execute instructions on a non-transitory, computer-readable medium to configure or support one or more of the components 230-238 to perform these operations.

As shown, the memory 238 may take the form of a database engine. As such, the memory 238 may include numerous databases for storing, processing, and/or securing data in the server device 102. For example, the database engine may include relational databases, possibly to perform account data processing and/or online analytical processing of user account data. The database engine may generate numerous search queries, search multiple databases in parallel, and produce search results simultaneously and/or consecutively. As such, the database engine may create multiple tables, database objects, indices, and/or views to perform user account management and/or analytical processing of numerous user accounts.

Any two or more of the components 230-238 described above may be combined to take the form of one or more multi-purpose processors, microprocessors, and/or special purpose processors, among other types of processors. For example, two or more of the processor 230, the account management component 232, the authentication component 234, the communication interface 236, and the memory 238 may be combined. Further, the combined device may take the form of one or more network processors, DSPs, PSOCs, FPGAs, and/or ASICs, among other types of processing devices and/or components. As such, the combined device may be configured to carry out various operations of the components 230-238. It should be noted that components 230-238 described above may provide benefits, improvements, and/or advantages over conventional or general-purpose server devices and/or computers. For example, components 230-238 may receive requests (e.g., a client requests) and determine user accounts more efficiently through the memory 238 that takes the form of the database engine described above. Further, components 230-238 may determine user devices associated with the user accounts and generate electronic messages through the dedicated authentication component 234 that optimally performs such functions.

In some embodiments, the server device 200 receives a request (e.g., a client request) from a client or remote device such as those described above, where the request indicates a user request to purchase one or more items. The account management component 232 of the server device 200 determines a user account associated with the user request to purchase the one or more items. Further, the account management component 232 determines a user device associated with the user account. The authentication component 234 of the server device 200 generates an electronic message that indicates a request or requirement to approve or authenticate the user request to process the user request. Further, the authentication component 234 initiates a transmittal of the electronic message to the user device. The communication interface 236 of the server device 202 receives user data from the user device in response to the transmittal of the electronic message that indicates the request or requirement to approve or authenticate the user request.

It can be appreciated that the server device 200, the chassis 202, the trays 204 and 206, the slots 208 and 210, the power supply 212, the communication network 218, and the components 230-238 may be deployed in other ways. The operations performed by components 230-238 may be combined or separated for a given embodiment and may be performed by a greater number or fewer number of components or devices. Further, one or more components or devices may be operated and/or maintained by the same or different entities.

Figure 3A:
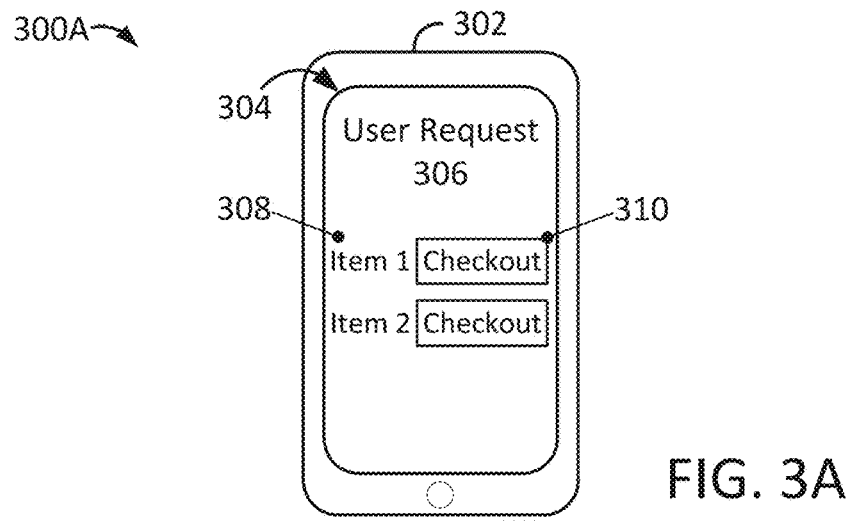
FIG. 3A illustrates an exemplary system and a user request, according to an embodiment.
Figure 3B:
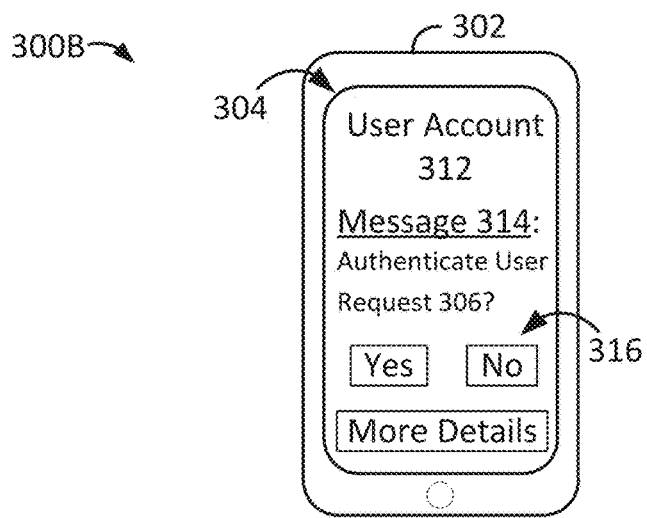
FIG. 3B illustrates an exemplary system and an electronic message, according to an embodiment.
Figure 3C:
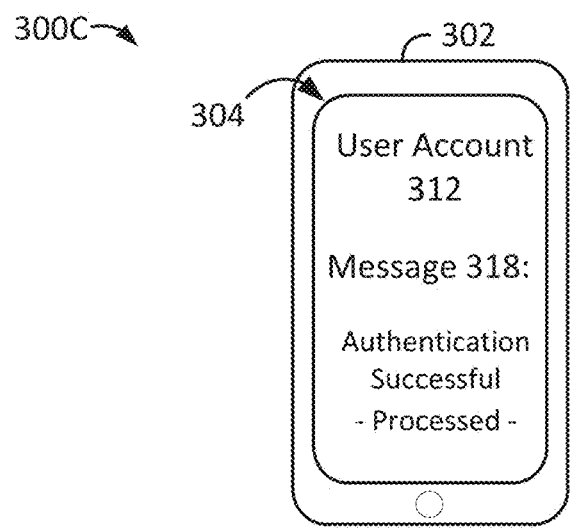
FIG. 3C illustrates an exemplary system and a successful authentication, according to an embodiment.

FIGS. 3A-3C illustrate exemplary systems 300A, 300B, and 300C, according to an embodiment. FIG. 3A illustrates an example system 300A and a user request, according to an embodiment. As shown, the user device 302 may be a smartphone, possibly with access to a user account with a payment provider such as those described above. As shown, the user device 302 may include an input/output (I/O) interface 304. The I/O interface 304 may display a user request 306, possibly created by a user that wishes to purchase one or more items 308 from a website or mobile app. In some instance, the user request 306 may include a phone number entered by the user or possibly an email and/or an account number, among other possible ways to identify the user or the user's account. The system 300A may include a server device, such as the payment provider's server described above, that receives the user request 306 from a remote device. For example, the remote device may be the server running the website or app. The request may indicate the user request 306 to purchase one or more items 308, shown as "item 1" and "item 2." As shown, statuses 310 of items 1 and 2 may indicate "checkout," "checking out," and/or an equivalent status.

FIG. 3B illustrates an exemplary system 300B and an electronic message, according to an embodiment. As noted, the payment provider's server device may receive the user request 306 to purchase the one or more items 308. An account management component of the server device, such as those described above, may determine a user account 312 associated with the user request 306 to purchase the one or more items 308. For example, the account management component may determine the user account 312 based on a phone number, email address, a home address, and/or an account number provided in the user request 306. Further, the account management component may determine one or more ways to send an electronic message to the user device 302 associated with the user account 312. Yet further, an authentication component of the server device, such as those described above, may generate an electronic message 314 that indicates a request or requirement to approve or authenticate the user request 306 such that the user may purchase the one or more items 308. As such, the authentication component may initiate a transmittal of the electronic message 314 to the user device 302.

As shown, the I/O interface 304 may display the user account 312, possibly opening up in the payment provider's mobile app of the user device 302. The I/O interface 304 may display the electronic message 314 in the mobile app, possibly provided by a push notification, a text message, an email, and/or a URL link, among other possible ways to retrieve the electronic message 314 as described above. As shown, the electronic message 314 may provide, "Authenticate User Request 306?" Further, user data 316 may provide selections, "Yes," "No," and "More Details." Thus, by selecting "Yes," the user request 306 to purchase the one or more items 308 may be processed under the user account 312. Further, by selecting "No," the user request 306 may be declined such that the one or more items 308 are not purchased under the user account 312. Yet further, by selecting "More Details," various details of the user request 306 may be viewed such as, for example, descriptions of items 1 and 2, the cost to purchase items 1 and 2, among additional details associated with purchasing items 1 and 2. Thus, the various details of the user request 306 may be reviewed before processing the user request 306.

FIG. 3C illustrates an exemplary system 300C and a successful authentication, according to an embodiment. In some embodiments, the communication interface of the server device may receive user data, e.g., user data 316, from the user device 302 in response to a transmittal of the electronic message 314 that indicates the requirement to accept or authenticate the user request 306. The authentication component may determine the user data 316 received includes authentication data to authenticate the user request 306. For example, by selecting "Yes" in the electronic message 314 described above, the authentication component may determine the user data 316 received includes data to authenticate the user request 306. As such, the authentication component may determine a successful authentication of the user request 306 to purchase the one or more items 308. Thus, the server device may process the user request 306 to purchase the one or more items 308 based on the successful authentication. In some instances, the authentication component further generates a second electronic message 318 that indicates a successful authentication of the user request 306 and initiates a transmittal of the second electronic message 318 to the user device 304. As shown, the I/O interface 304 displays the second electronic message 318 indicating "authentication successful" and "processed."

In some embodiments, a non-transitory computer-readable medium may have stored thereon instructions that, when executed by the server device, cause the server device to perform operations. In some instances, the operations may include receiving, by a communication interface of the server device, data generated from a website or an app server. For example, the website or app server may run or manage websites and/or apps that sell items to users. Thus, the website or app server may be communicatively linked to a data or cellular network such as those described above in relation to FIG. 1. The data generated may include the user request 306 to purchase the one or more items 308 for the user account 312. Further, the user request may include contact information (e.g., phone numbers, email addresses, contact addresses, etc.) associated with the user account.

The operations may also include generating, by one or more components of the server device, an electronic message 314 that indicates a request to approve or authenticate the user request 306. Further, the operations may include transmitting, by the communication interface, the electronic message 314 to the user device 302 associated with the user account 312. The operations may also include receiving, by the communication interface, user data 316 from the user device 302 in response to the transmitted electronic message 314. Further, the user data 316 may indicate an approval of the user request 306 to purchase the one or more items 308. Thus, the operations may also include processing, by the one or more components, the user request 306 to purchase the one or more items 308 for the user account.

In some embodiments, transmitting the electronic message 314 to the user device 302 may include transmitting a link to the user device 302. Thus, the operations further comprising enabling the user device to initiate a payment app through the transmitted link such as a uniform resource locator (URL) link. The payment app may be an app that allows the user to purchase items through the user account 312 with a payment provider. As such, processing the user request 306 to purchase the one or more items 308 for the user account 312 may include processing the user request 306 through the payment app initiated on the user device 302. In some instances, the user data 316 received from the user device 302 may include biometric data, a password, and/or a PIN number.

Figure 4A:
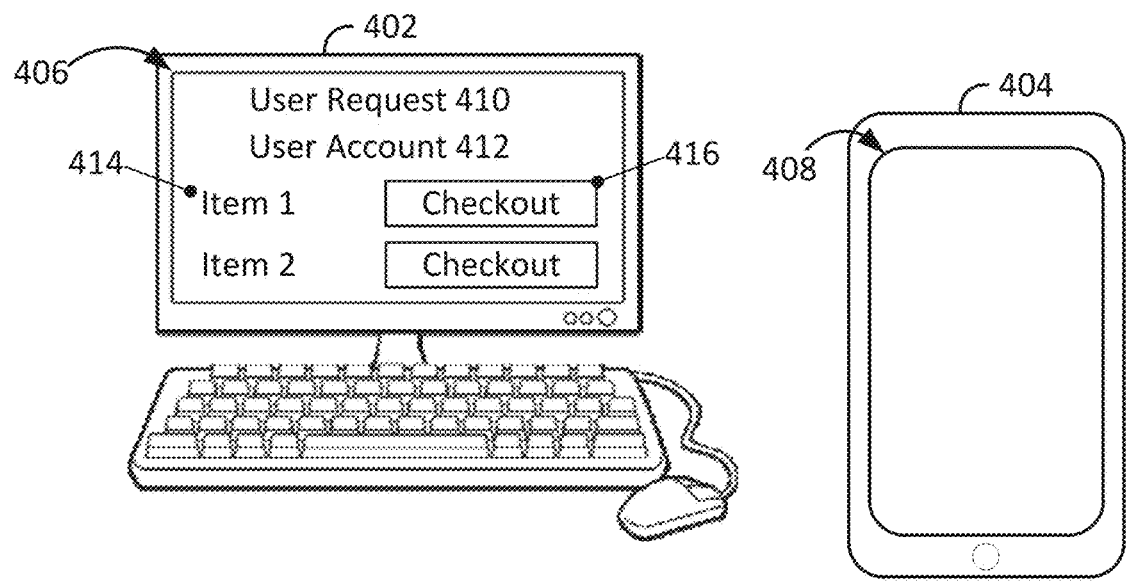
FIG. 4A illustrates an exemplary system and a user request, according to an embodiment.

FIG. 4A illustrates an exemplary system 400A and a user request, according to an embodiment. The client device 402 may be referred to as a user device and/or a remote device, e.g., a computer, smartphone, or laptop computer, associated with a user account. Further, a user device 404 may be a user device, e.g., a smartphone, associated with the user account. For example, the user device 404 may be a first or primary device associated with the user account and the client device 402 may be a second or secondary device associated with the user account. In practice, a user may view purchasable items with the client device 402 and the checkout path may be split or cutover to the user device 404. Yet further, in some instances, the client device 402 may be a merchant device at a merchant location or store. For instance, the client device 402 may also take the form of a merchant device, a checkout device, a POS device, a register device, and/or a counter device, possibly taking the form of a tablet computer.

As shown, the client device 402 may include an input/output (I/O) interface 406 and the user device 404 may include an I/O interface 408. The I/O interface 406 may display a user request 410, possibly created by a user that wishes to purchase one or more items 414. The system 400A may include a server device, such as a payment provider's server described above, that receives a request from the client device 402. The request may indicate the user request 410 to purchase one or more items 414, shown as "item 1" and "item 2." As shown, statuses 416 of items 1 and 2 may indicate "checkout," "checking out," and/or an equivalent status.

An account management component of the server device, such as those described above, may determine a user account 412 associated with the user request 410 to purchase the one or more items 414. It should be noted that the user request 410 may indicate the user account 412. Yet, in some instances, the user request 410 may additionally or alternatively indicate a phone number, an email address, a home address, an account number, and/or another identifier associated with the user account 412. Further, the account management component may determine the user device 404 associated with the user account. For example, the user device 404 may be selected or identified by the user as a primary device of the user account 412. Yet further, an authentication component of the server device, such as those described above, may generate an electronic message that indicates a request or requirement to approve or authenticate the user request 410 to process the user request 410. As such, the authentication component may initiate a transmittal of the electronic message to the user device 404.

Figure 4B:
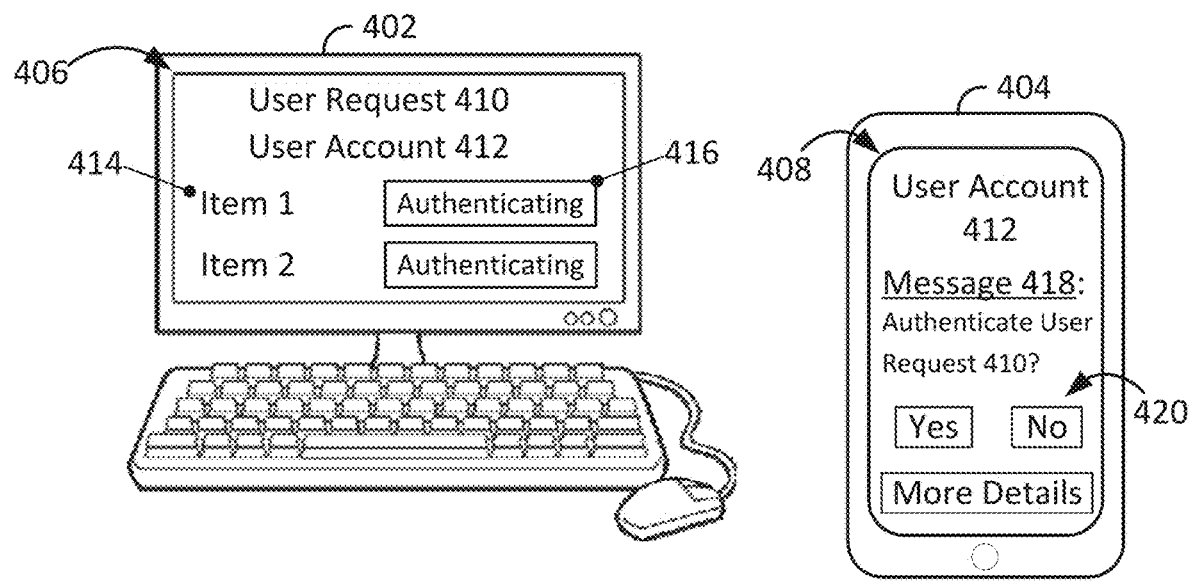
FIG. 4B illustrates an exemplary system and an electronic message, according to an embodiment.

FIG. 4B illustrates an example system 400B and an electronic message, according to an embodiment. As shown, the client device 402 may include the I/O interface 406 and the user device 404 may include the I/O interface 408. The I/O interface 406 may display the user request 410 to purchase the one or more items 414, shown as "item 1" and "item 2," for the user account 412. As shown, statuses 416 of items 1 and 2 may indicate "authenticating," "validating," "confirming," and/or a similar status. As noted, the account management component may determine the user device 404 associated with the user account 412. Yet further, the authentication component may generate an electronic message 418 that indicates a request or requirement to approve or authenticate the user request 410 to process the user request 410.

As such, the authentication component may initiate a transmittal of the electronic message 418 to the user device 404. As shown, the I/O interface 408 may display the user account 412 and the electronic message 418, showing, "Authenticate User Request 410?" Yet further, user data 420 may provide selections, "Yes," "No," and "More Details." Thus, by selecting "Yes," the user request 410 to purchase the one or more items 414 may be processed. Further, by selecting "No," the user request 410 may be declined such that the one or more items 414 are not purchased under the user account 412. Yet further, by selecting "More Details," various details of the user request 410 may be viewed such as, for example, descriptions of items 1 and 2 (e.g., size, dimensions, length, and/or width), the cost to purchase items 1 and 2, among additional details associated with purchasing items 1 and 2.

As such, a communication interface of the server device may receive user data 420 from the user device 404 in response to the transmittal of the electronic message 418 that indicates the request or requirement to approve or authenticate the user request 410.

Figure 5A:
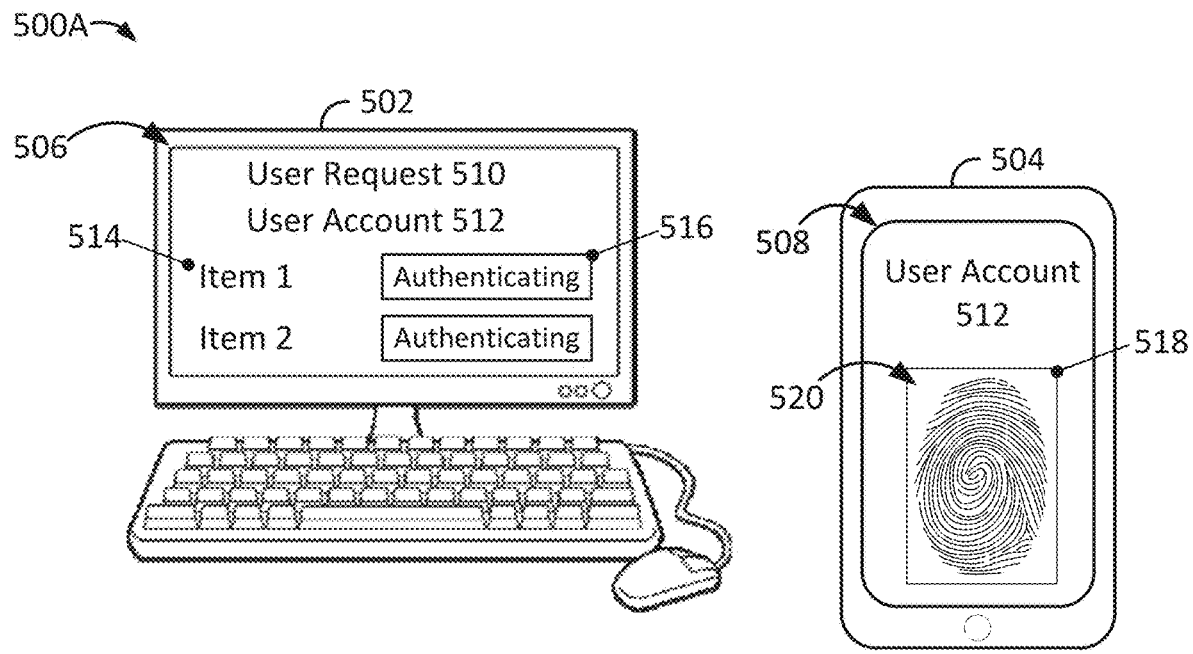
FIG. 5A illustrates an exemplary system and authenticating a user request, according to an embodiment.

FIG. 5A illustrates an exemplary system 500A and authenticating a user request, according to an embodiment. As shown, a client device 502 and a user device 504, possibly referred to as remote devices, may take the form of the client device 402 and a user device 404, respectively, described above in relation to FIGS. 4A-B. Thus, the client device 502 may include an I/O interface 506 and the user device 504 may include the I/O interface 508. The I/O interface 506 may display the user request 510 to purchase one or more items 514, shown as "item 1" and "item 2," for a user account 512, as similarly described above in relation to FIGS. 4A-B. Further, statuses 516 of items 1 and 2 may also indicate "authenticating," "validating," "confirming," and/or a similar status.

As noted, the communication interface of the server device may receive user data, e.g., user data 518, from the user device 504 in response to a transmittal of an electronic message that indicates the request or requirement, as described above, to approve or authenticate the user request 510. The authentication component may determine the user data 518 received includes authentication data 520. As shown, the authentication data 520 may take the form of fingerprint data. Yet, it should be noted that the authentication data 520 may include various other forms of data such as eye, iris, and/or retinal data, pulse or pulse pattern data, voice or vocal recognition data, movement data, gesture data, and/or passive movement data, among other forms of data to authenticate a user or a user request.

Figure 5B:
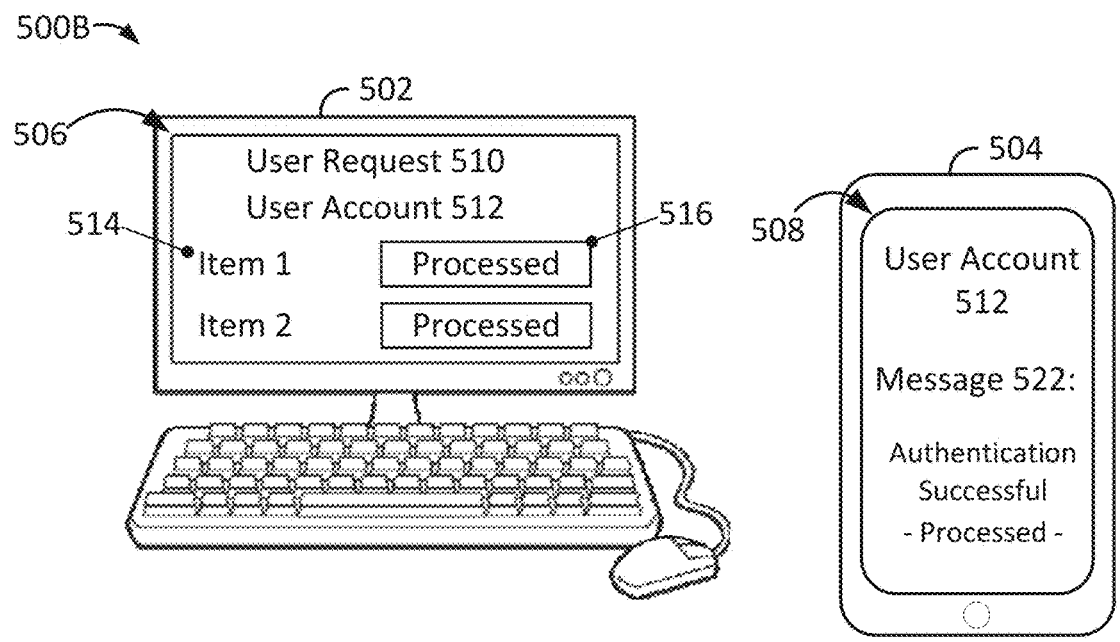
FIG. 5B illustrates an exemplary system and a successful authentication, according to an embodiment.

FIG. 5B illustrates an example system 500B and a successful authentication, according to an embodiment. As shown, the client device 502 may include the I/O interface 506 and the user device 504 may include the I/O interface 508. The I/O interface 506 may display the user request 510 to purchase the one or more items 514, shown as "item 1" and "item 2," for the user account 512. As noted, the authentication component may determine the user data 518 received includes authentication data 520 to authenticate the user request 510.

In some instances, the authentication component determines a successful authentication of the user request 510 to purchase the one or more items 514 based on the authentication data 520. As such, the server device may process the user request 510 to purchase the one or more items 514 based on at least the successful authentication. As shown, statuses 516 of items 1 and 2 may indicate "processed," "process completed," "purchased," "authentication successful," and/or a similar status.

In some instances, the authentication component further generates a second electronic message 522 that indicates a successful authentication of the user request 510 and initiates a transmittal of the second electronic message 522 to at least one of the client device 502 and/or the user device 504. As shown, the I/O interface 508 of the user device 504 displays the second electronic message 522 indicating "authentication successful" and "processed."

Figure 5C:
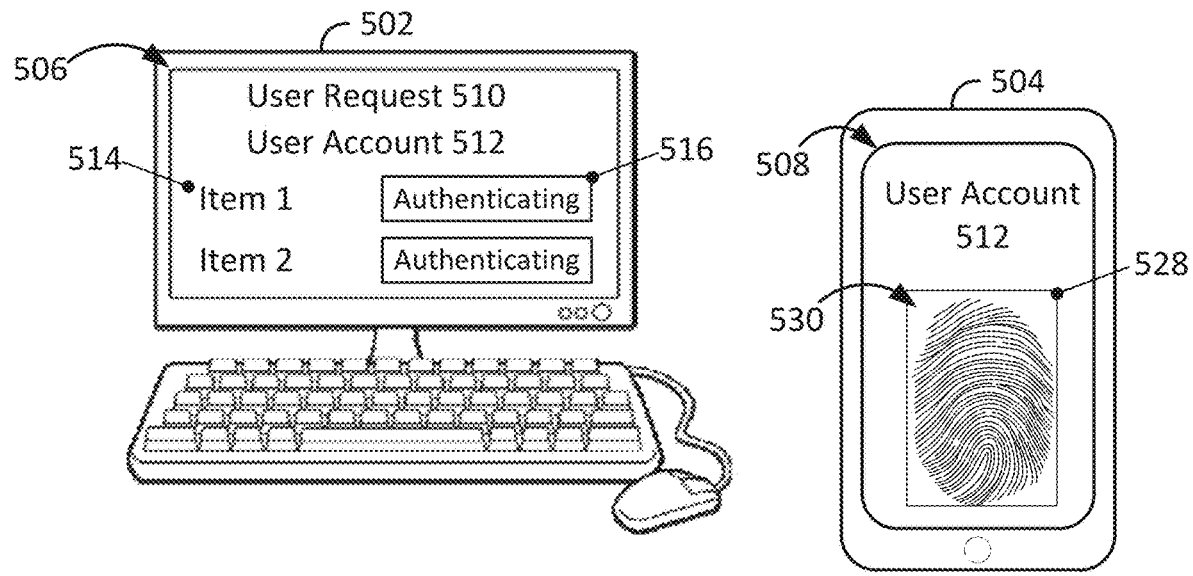
FIG. 5C illustrates an exemplary system and authenticating a user request, according to an embodiment.

FIG. 5C illustrates an example system 500C and authenticating a user request, according to an embodiment. As shown, the client device 502 may include an I/O interface 506 and the user device 504 may include the I/O interface 508 as described above. The I/O interface 506 may display the user request 510 to purchase the one or more items 514, shown as "item 1" and "item 2," for user account 512, as similarly described above in relation to FIGS. 5A-B. Further, statuses 516 of items 1 and 2 may also indicate "authenticating" as described above.

As noted above, the communication interface of the server device may receive user data, e.g., user data 528, from the user device 504 in response to a transmittal of an electronic message that indicates the request or requirement to approve or authenticate the user request 510. The authentication component may determine the user data 528 received includes authentication data 530. As shown, the authentication data 530 may take the form of fingerprint data. Yet, it should be noted that the authentication data 530 may be different than the authentication data 520 described above to attempt an authentication of the user request 510. Further, it should be noted that the authentication data 530 may also include various other forms of data such as eye, iris, and/or retinal data, pulse (pattern) data, movement data, and/or passive movement data, among other forms of data to authenticate a user or a user request.

Figure 5D:
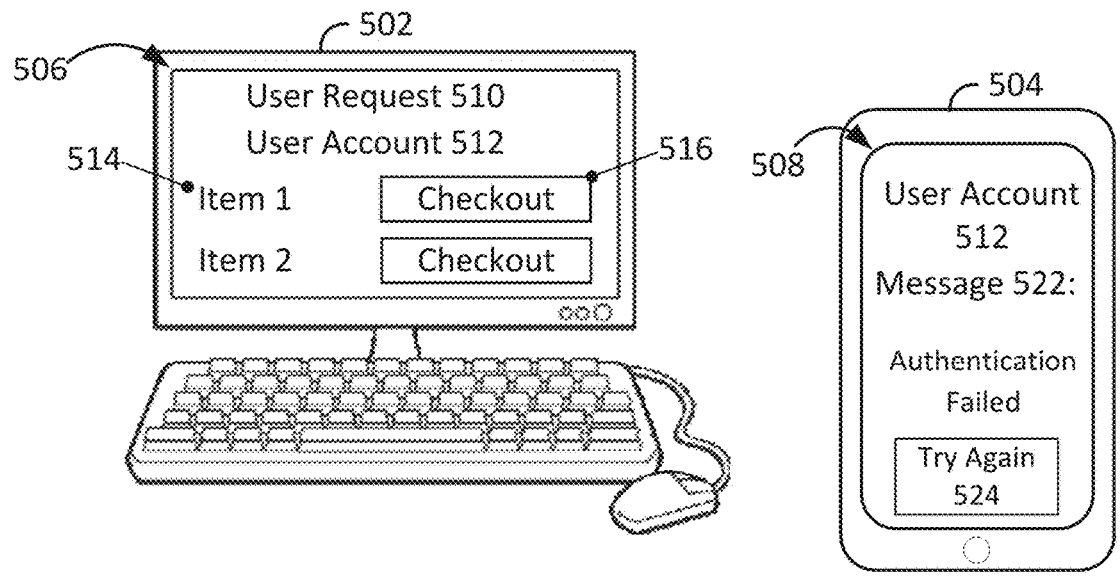
FIG. 5D illustrates an exemplary system and a failed authentication, according to an embodiment.

FIG. 5D illustrates an example system 500D and a failed authentication, according to an embodiment. As shown, the client device 502 may include the I/O interface 506 and the user device 504 may include the I/O interface 508. The I/O interface 506 may display the user request 510 to purchase the one or more items 514, shown as "item 1" and "item 2," for the user account 512. As noted, the authentication component may determine the user data 528 received includes authentication data 530.

In some embodiments, the authentication component may determine the user data 528 does not include the authentication data 520 required to authenticate the user request 510. Thus, the authentication component generates a second electronic message 522 that indicates a failed authentication of the user request 510 and initiates a transmittal of the second electronic message 522 to the client device 502 and/or the user device 504. As shown, the I/O interface 508 of the user device 504 displays the second electronic message 522 indicating "authentication failed" or an equivalent electronic message. Yet further, the second electronic message 522 provides a selection to "Try again." Thus, by selecting "Try again," the user data 518 (e.g., authentication data 520) may be entered to authenticate the user request 510 to purchase the one or more items 514.

Figure 6:
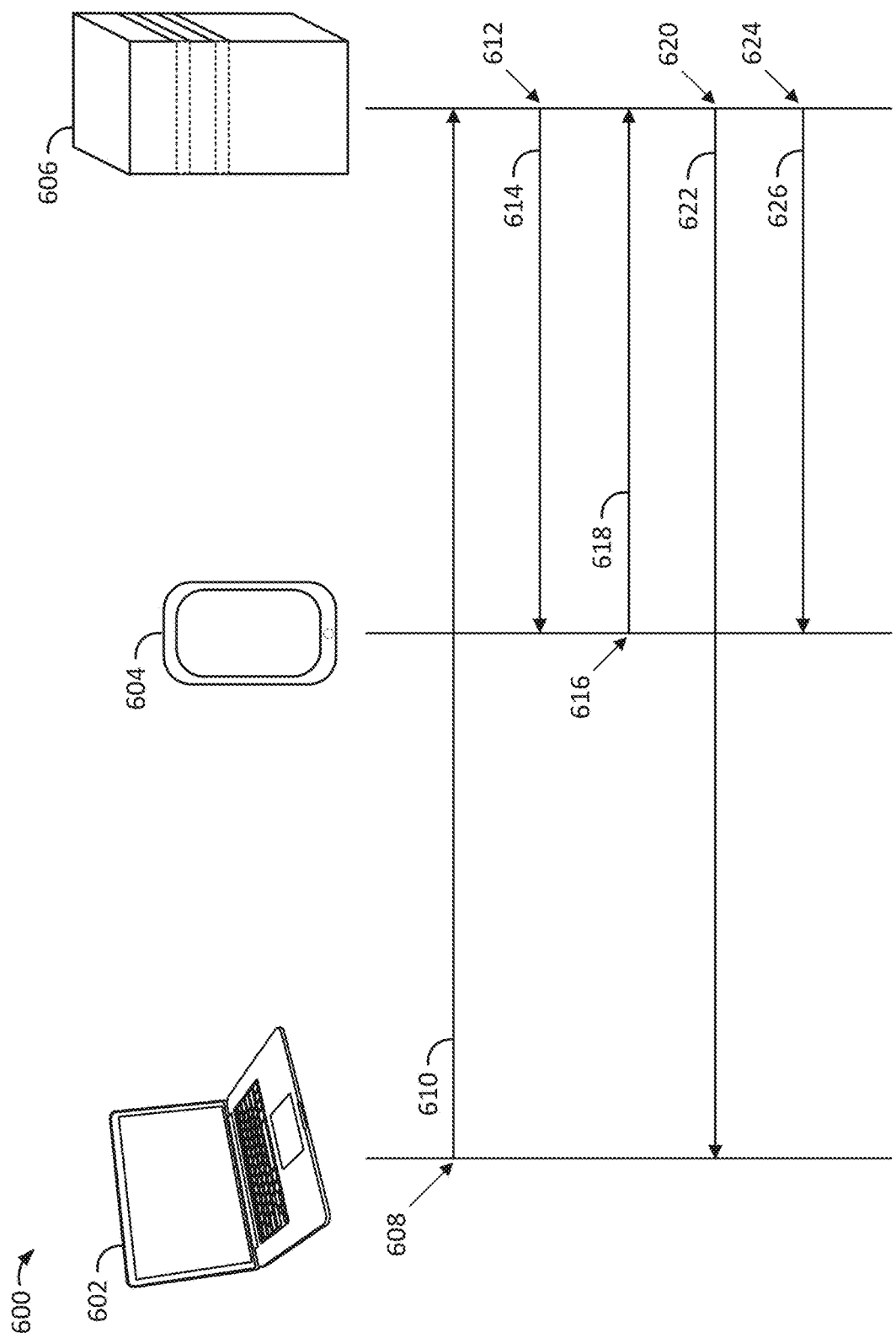
FIG. 6 illustrates an exemplary data path diagram, according to an embodiment.

FIG. 6 illustrates an exemplary data path diagram 600, according to an embodiment. As shown in the diagram 600, client device 602 may take the form of a laptop computer and may be referred to as a remote device. Further, in some instances, the client device 602 may take the form of the client device 502 described above. As such, client device 602 may be a remote device, including a user device such as a secondary user device, a merchant server running one or more merchant websites, and/or a merchant device (e.g., a POS device) at a merchant location, among other possible devices. Further, user device 604, possibly also referred to as a remote device, may take the form of a smartphone that the user may operate to authenticate user requests to purchase one or more items as described above. Yet further, a server device 606 may take the form of the server devices described above in relation to FIGS. 1-2B, such as a payment provider's server device, for example.

At step 608, the server device 606 may receive the request 610 (e.g., a client request) from client device 602, where the request 610 indicates a user request to purchase one or more items. The account management component of the server device 606 may determine a user account associated with the user request to purchase the one or more items. Further, the account management component may determine the user device 604 associated with the user account. As such, the authentication component of the server device 606 may generate an electronic message that indicates a request or requirement to approve or authenticate the user request to process the user request.

At step 612, the authentication component may initiate a transmittal of the electronic message 614 to the user device 604. As shown, the checkout path may be split from the client device 602 to the user device 604 and/or the server device 606, thereby localizing data between the user device 604 and the server device 606 to ensure the security of confidential and/or sensitive data. In particular, the localized data is exchanged between the user device 604 and the server device 606, thereby minimizing and/or eliminating data exchanged between the user device 604 and the client device 602. In some instances, the client device 602 may be a merchant server and/or POS device that may be susceptible to possible interceptors.

At step 616, a communication interface of the server device 606 receives user data 618 from the user device 604 in response to the transmittal of the electronic message 614 that indicates the request or requirement to approve or authenticate the user request.

At step 620, the authentication component determines the user data 618 received includes authentication data. Further, the authentication component determines a successful authentication of the user request to purchase the one or more items based on at least the authentication data. As such, the server device 606 may process the user request to purchase the one or more items based on at least the successful authentication. As shown, the server device 606 may provide data 622 to the client device 602 to process the user request to purchase the one or more items based on at least the successful authentication. Thus, the server device 606 communicates with the client device 602 to process the purchase. In practice, consider the client device 602 is a merchant server or device such as, for example, a merchant server running an online website and/or a checkout device at a merchant location. In such instances, the server device 606 interfaces with the client device 602, thereby securing the user device 604 from communicating with the client device 602 and maintaining or increasing security levels of information stored in the client device 602. As such, the user may safely and/or securely maintain confidential or sensitive information in the user device 604 without having to provide such information to a merchant website and/or checkout device. It should be noted that the communication lines and/or protocols between user device 604 and the server device 606 may be encrypted and/or monitored to ensure the security of the data exchanged.

At step 624, the authentication component may generate a second electronic message 626 that indicates the successful authentication of the user request and initiates a transmittal of the second electronic message to the user device 604.

Figure 7:
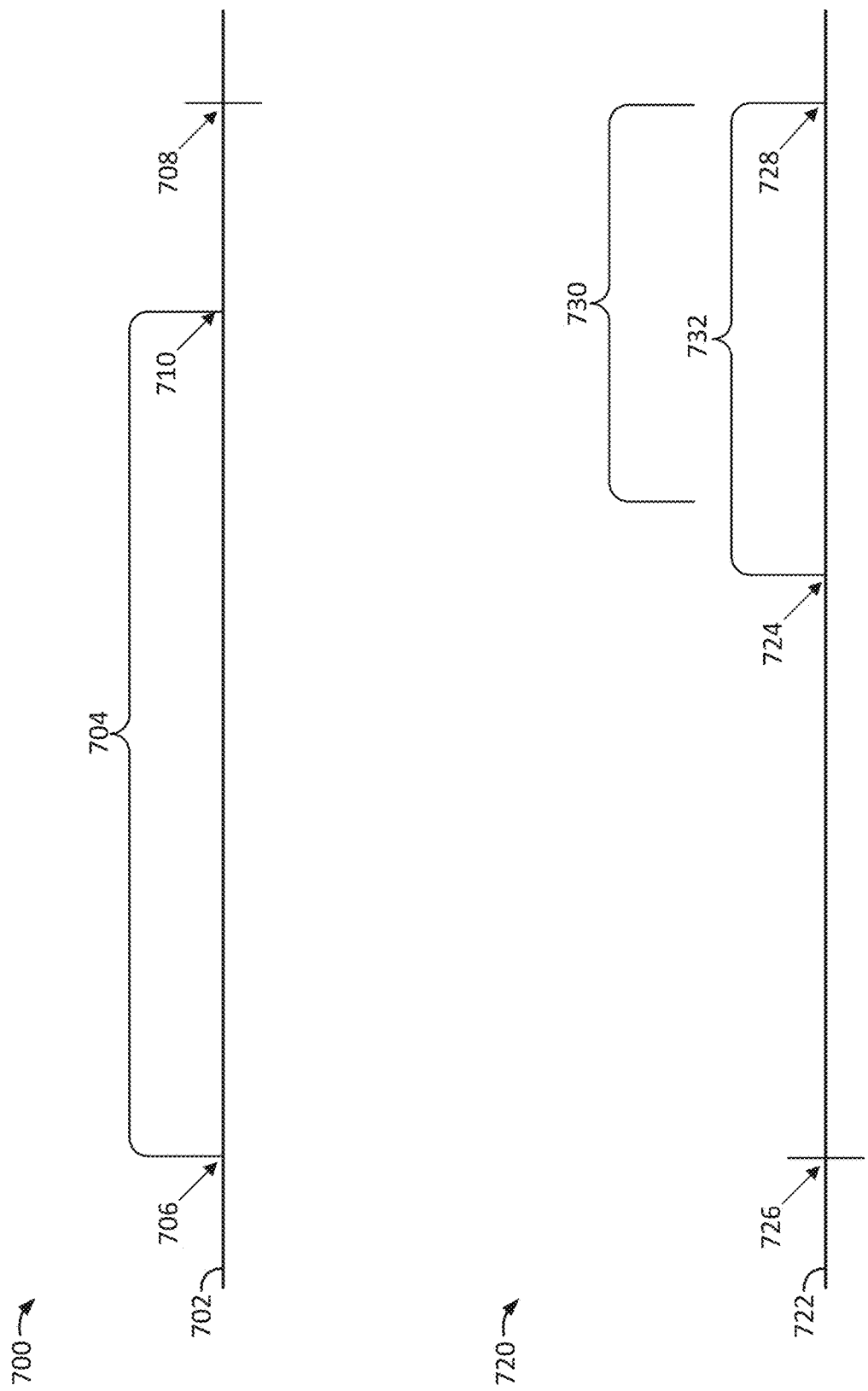
FIG. 7 illustrates exemplary timeline charts, according to an embodiment.

FIG. 7 illustrates exemplary timeline charts 700 and 702, according to an embodiment. In some embodiments, a user request to purchase one or more items may expire, terminate, and/or time out, among other possibilities. For example, a user request that has not been authenticated after a given time period may time out, thereby preventing such user requests from being authenticated or accepted at later points in time. Such mechanisms may help to maintain or increase security levels associated with purchasing items for the user's account.

As shown in FIG. 7, the timeline chart 700 may include a timeline 702. As noted, the server device may generate an electronic message that indicates the request or requirement to approve or authenticate the user request to process the user request. Further, the server device may transmit the electronic message to the user device. Yet further, the server device may receive user data from the user device in response to the transmittal of the electronic message.

In some embodiments, the authentication component may determine a time period 704 to process the purchase of the one or more items for the user account. The time period 704 may begin at a time 706 of the transmittal of the electronic message to the user device. Further, the authentication component may determine whether the user request is timed out based on whether a time 708, e.g., when the user data is received by the server device, is within the time period 704. As shown in the timeline chart 700, the time 708 when the server device receives the user data is after a time 710 terminating the time period 704. Thus, the server device may determine that the user request is expired or timed out. As such, to purchase the one or more items, a new user request may be required.

Further, as shown in FIG. 7, timeline chart 720 may include a timeline 722. As shown, the timeline chart 720 may include a time 726 of the transmittal of the electronic message to the user device. The authentication component may further determine that the user data received indicates a time or timestamp 724 when the user device accessed, e.g., displayed or viewed, the transmitted electronic message. Further, the authentication component may determine a time period 732 to process the one or more items. As shown, the time period 732 begins at the time 724 when the user device accessed the transmitted electronic message and ends at a time 728 when the user data is received by the server device. As such, the authentication component may determine whether the user request is timed out based on whether the determined time period 732 is greater than or equal to a threshold time period 730. As shown in the timeline chart 720, the determined time period 732 is greater than the threshold time period 730. Thus, the server device may determine that the user request is expired or timed out. As such, to purchase the one or more items, a new user request may be required.

It should be noted that the user account may specify various preferences regarding the time periods used to determine whether a user request is timed out or expired. For example, one or more preferences of the user account may allow the user to authenticate or accept the user request in the time line 702 based on the user data received at the time 708. Further, the preferences may allow the threshold time period 730 to be modified, possibly to shorten the threshold time period 730.

Figure 8:
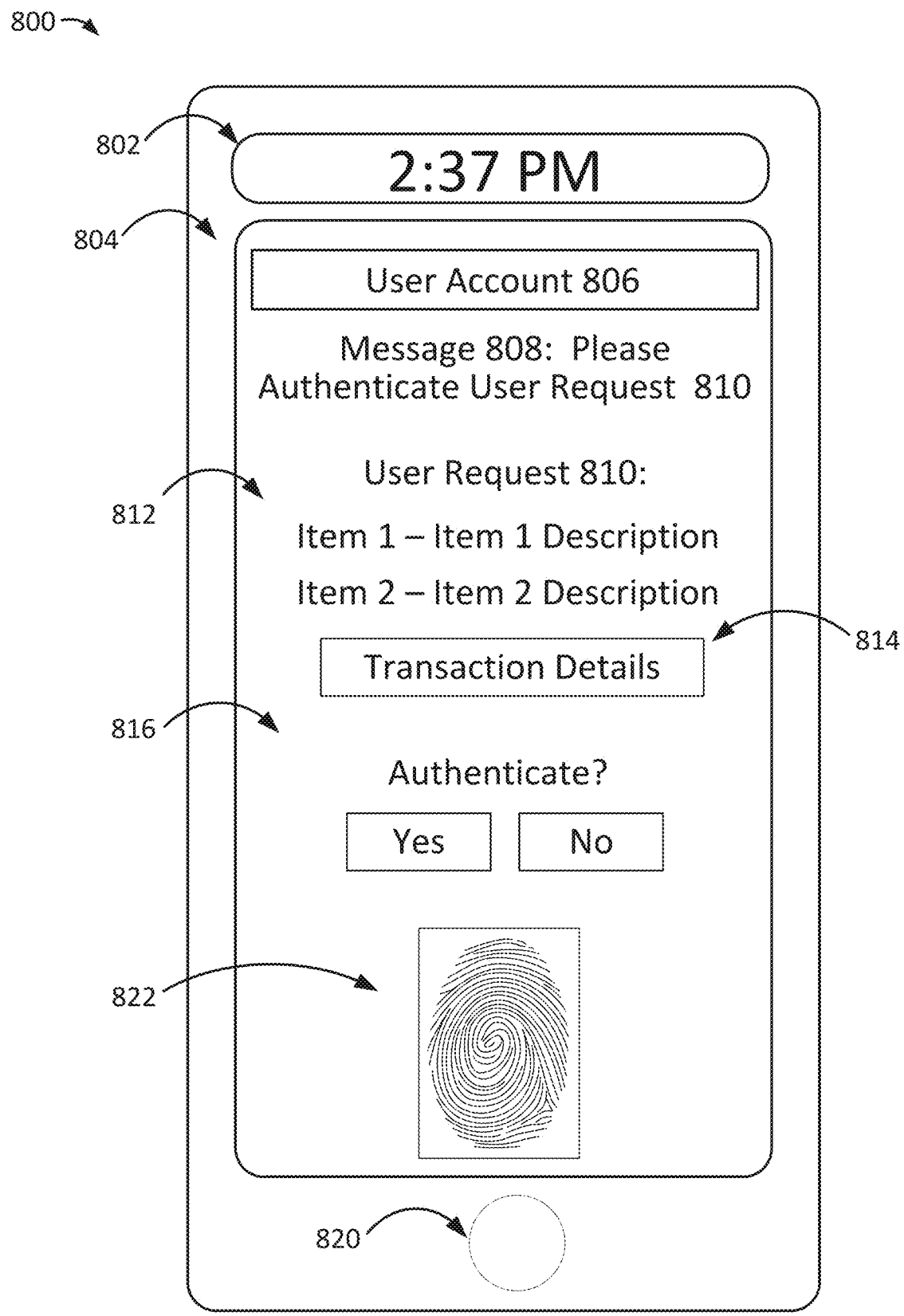
FIG. 8 illustrates an exemplary input/output (I/O) interface of a user device, according to an embodiment.

FIG. 8 illustrates an exemplary input/output (I/O) interface 804 of a user device, according to an embodiment. As shown, the user device 800, possibly referred to as a remote device, may take the form of the user devices 302, 404, 504, and/or 604 described above in relation to FIGS. 3A-6. Further, the user device 800 may display a time 802 via an I/O interface 804 that may take the form of I/O interfaces 304, 408, and/or 508 as described above.

In some embodiments, a non-transitory computer-readable medium may have stored thereon instructions that, when executed by the user device 800, cause the user device 800 to perform operations. In some instances, the operations may include displaying, by the I/O interface 804 of the user device 800, a first electronic message 808 that indicates a request or requirement to approve or authenticate a user request 810 to purchase one or more items 812 under a user account 806. As shown, the one or more items 812 may include "Item 1" with an "Item 1 Description," such as a clothing item with a description of the clothing item (e.g., size, dimension, waist, length, and inseam). Further, the one or more items 812 may include "Item 2" with an "Item 2 description," such as a music track item (e.g., a song or a multimedia recording) with a description or genre of the music, for example. In addition, the I/O interface 804 may include user data 814 with a selection for "Transaction Details." For example, by selecting "Transaction Details," the I/O interface 804 may provide transactional information for purchasing the one or more items 812 with the user account 806 including, for example, credit card information and/or account balance information stored with the user account 806 that may be used to purchase the one or more items 812 and/or the cost to purchase the one or more items 812, among other details.

In some embodiments, the operations may include receiving, by the I/O interface 804, an input from a user based on the electronic message 808 that indicates the request or requirement to approve or authenticate the user request 810 to purchase the one or more items 812. As shown, the electronic message 808 may include a question, "Authenticate?" or "Approve?" and the user data 816 may provide other selections, "Yes" or "No." Thus, by selecting "Yes," the user request 810 to purchase the one or more items 812 may be processed. Further, by selecting "No," the user request 810 may be declined such that the one or more items 812 are not purchased with the user account 806.

In some embodiments, the operations may include generating, by at least one processor of the user device 800, user data 816 based on the input received from the user. For example, the user data 816 may be based on selecting "Yes" or "No" described above. In particular, by selecting "Yes," the user data 816 may be modified or generated to include payment data for purchasing the one or more items 812. Further, the user data 816 may include payment data to purchase the one or more items 812 using funds from the user account 806. Yet further, the payment data may also include credit card information, debit card information, bank account information, checking account information, savings account information, and/or other types of information to process the payment for the one or more items 812.

In some embodiments, the operations may include transmitting, by a communication interface of the user device, the user data 816 to a second device. In some instances, the second device may be a remote device, for example, the payment provider's server device such as those described above in relation to FIGS. 1-7. Further, the second device may be another remote device, for example, a second user device associated with the user account. For instance, the user device 800 may take the form of the user's smartphone and the second user device may take the form of the user's laptop and/or computer. Yet, in some instances, the second device may be another remote device, such as a merchant server or device running a merchant website. Further, the second device may be a merchant device at a merchant location that takes the form of a point-of-sale (POS) device, a merchant laptop device, and/or a merchant tablet device, and/or another type of merchant device used to process purchases.

In some embodiments, the operations may include receiving, by the communication interface, a second electronic message generated by the second device based on the user data 816 transmitted to the second device. For example, the second electronic message received may indicate that the user request 810 has been "Authenticated," "Authentication Successful," and/or "Processed," possibly similar to the electronic message 522 described above in relation to FIG. 5B. Yet further, in some instances, the second electronic message received may indicate a request for authentication data such as a fingerprint data, gesture data based on a signature gesture associated with the user account 806, and/or touch data based on a tap signature that may be received by a sensor of the user device 800.

In some embodiments, the I/O interface 804 may include a sensor 820 that may, for example, take the form of a button, possibly also including a capacitive sensor and/or proximity sensor to sense, detect, and/or identify the user of the device 800. Further, the sensor 820 may include a biometric sensor such as a fingerprint sensor. Thus, receiving the input from user described above may include receiving, by the biometric sensor, a biometric input from the user. The biometric input may be a fingerprint input from the user based on the user's finger making physical contact with a surface of the sensor 820. In some embodiments, modifying or generating the user data 816 may include generating biometric data 822 based on at least the biometric input. Further, transmitting the user data 816 to the second device may include transmitting the biometric data 822 to the second device. Yet further, the second electronic message received may indicate a successful authentication of the user request 810 to purchase the one or more items 812 based on the biometric data 822 transmitted.

In some embodiments, the second electronic message received may indicate a failed authentication of the user request 810 to purchase the one or more items 812 based on the biometric data 822, possibly where the biometric data 822 does not match the stored biometric data associated with the user account 806 to authenticate the user request 810, among other user requests. As such, the instructions may further cause the user device 800 to perform additional operations including displaying, by the I/O interface 804, an option to attempt a second authentication of the user request 810 to purchase the one or more items 812.

Figure 9:
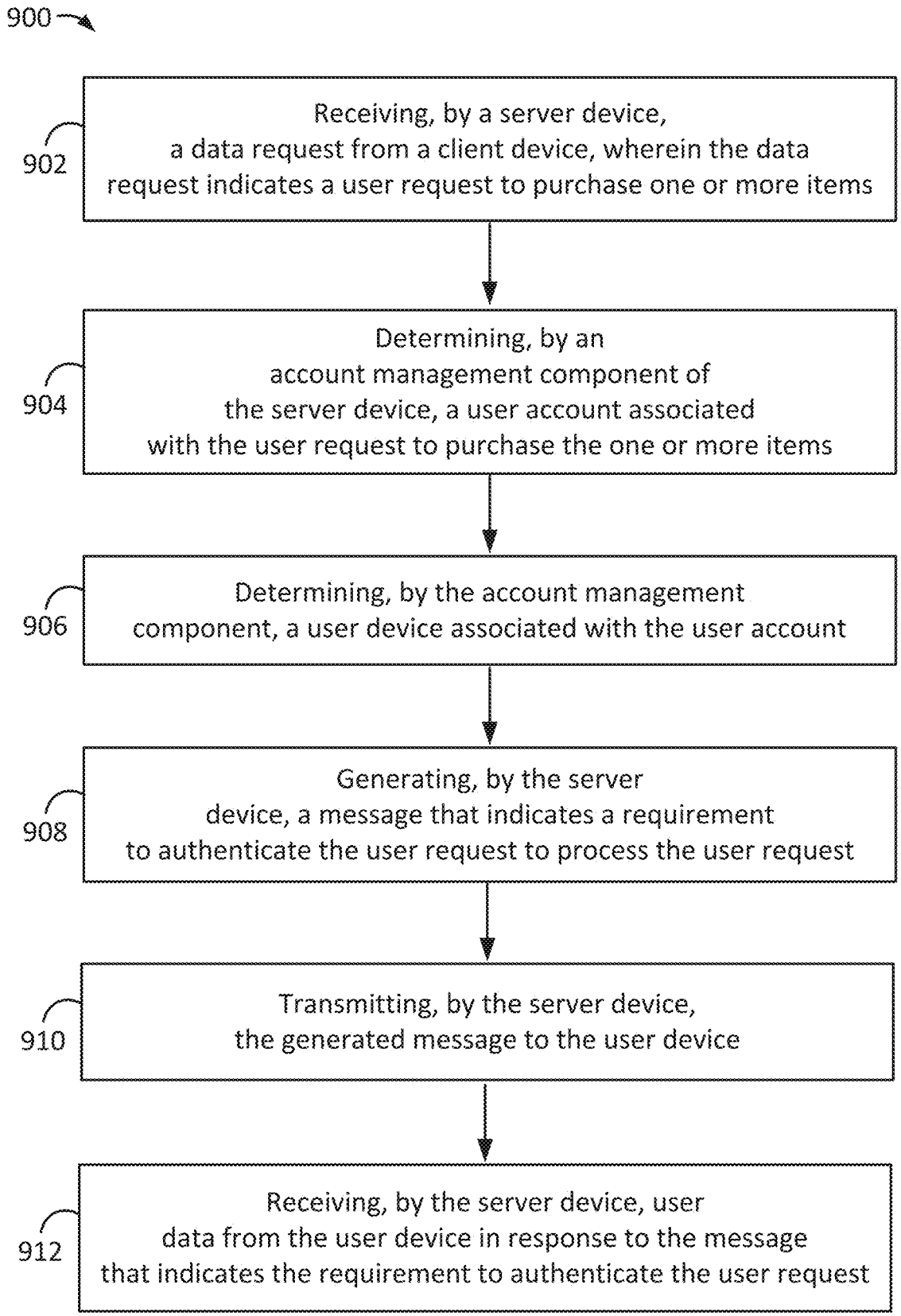
FIG. 9 is a flowchart of an exemplary method, according to an embodiment.

FIG. 9 is a flowchart of an exemplary method 900, according to an embodiment. Notably, one or more steps of the method 900 or other methods/processes described herein may be omitted, performed in a different sequence, and/or combined for various types of applications.

At step 902, the method 900 may include receiving, by a server device, a data request from a remote or client device, where the data request indicates a user request to purchase one or more items. For example, a server device may receive the data request from a client device in one or more manners described above to FIGS. 1-8. In some instances, the server device may receive the data request from a client device that takes the form of a youngster's smartphone, e.g., a son's, a daughter's, and/or a child's smartphone. The data request may indicate the youngster's request to purchase one or more clothing items from a merchant store, for example.

At step 904, the method 900 may include determining, by an account management component of the server device, a user account associated with the user request to purchase the one or more items. For example, the account management component may determine the user account in one or more manners described above in relation to FIGS. 1-8. In some instances, the account management component may determine the user account to be a family account. Considering one or more of the scenarios above, the family account may be accessed by the youngster's smartphone and/or the parent's smartphone.

At step 906, the method 900 may include determining, by the account management component, a user device associated with the user account. Considering one or more of the scenarios above, the user device associated with the user account may take the form of the parent's smartphone associated with the family account. Further, the parent's smartphone may have permissions to authorize, process, and/or authenticate purchases of items for the family account. For example, the parent's smartphone may have permissions to remotely authorize or process the youngster's purchases using funds from the family account. Yet, in some instances, the youngster's smartphone may not have such permissions to use funds from the family account, thereby requiring the parent to authorize, authenticate, and/or accept the requests.

At step 908, the method 900 may include generating, by the server device, an electronic message that indicates a request or requirement to approve or authenticate the user request to process the user request. For example, the electronic message may indicate the request or requirement to approve or authenticate the youngster's request to process the request to purchase the one or more items that the youngster is interested in.

At step 910, the method 900 may include transmitting, by the server device, the generated electronic message to the user device. For example, the generated electronic message may be transmitted to the parent's smartphone for approval. As such, the parent may review the youngster's request to purchase the one or more items remotely, without having to be in the merchant store with the youngster.

At step 912, the method 900 may include receiving, by the server device, user data from the user device in response to the electronic message that indicates the request or requirement to approve or authenticate the user request. For example, the server device may receive user data from the parent's smartphone in response to the electronic message that indicates the request or requirement to approve or authenticate the youngster's request. As such, the server device may process the youngster's request to purchase the one or more items accordingly. Yet, as noted, the client device may be second user device associated with the user account or a merchant device at a merchant location.

Figure 10:
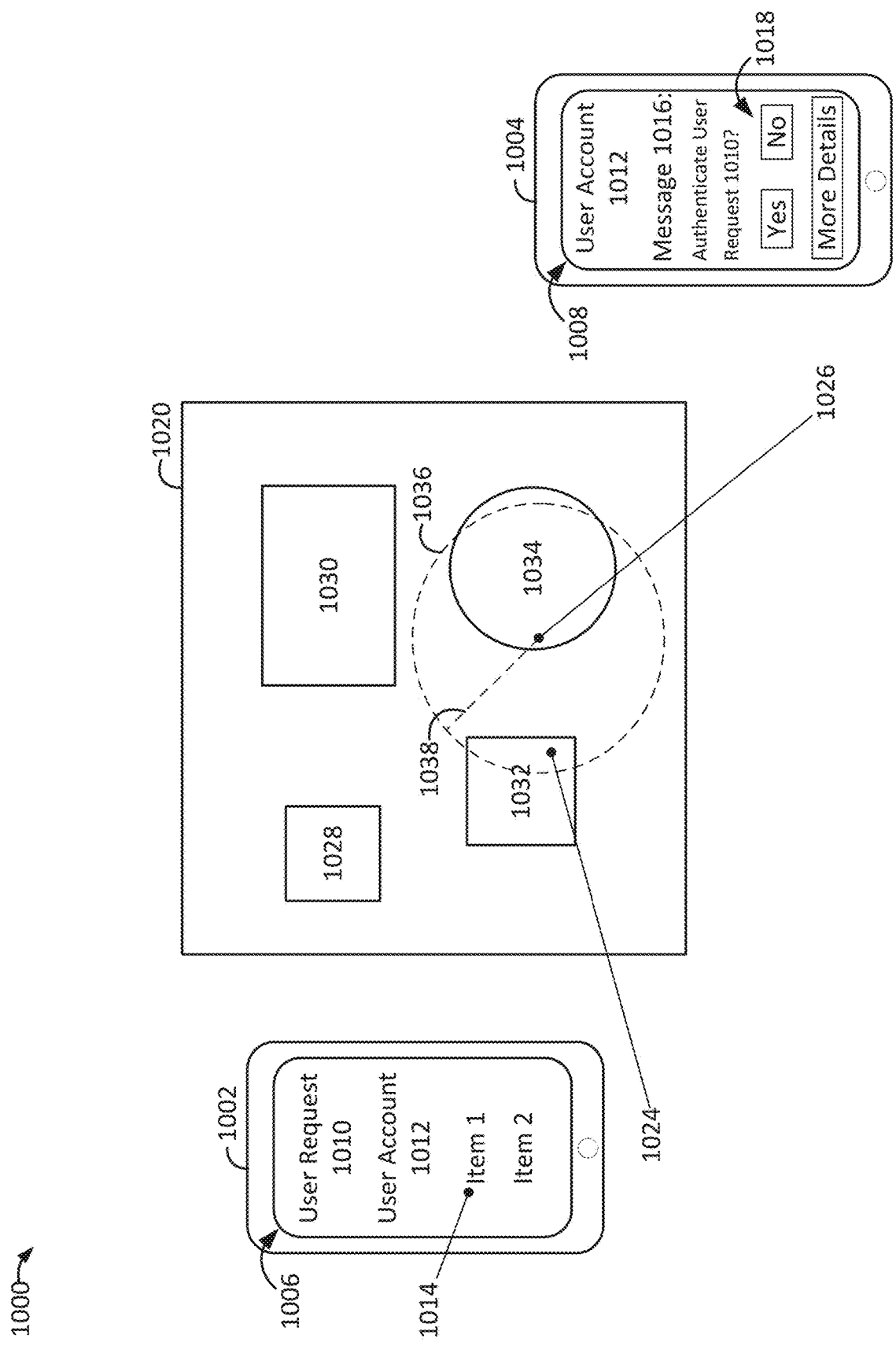
FIG. 10 is an exemplary system, according to an embodiment.

FIG. 10 is an exemplary system, according to an embodiment. In some instances, a server device such as the payment provider's server device described above in relation to FIG. 9 may receive a data request from a client device 1002, possibly referred to as a remote device that takes the form of a youngster's smartphone. The data request may indicate the user request 1010 initiated by the youngster to purchase one or more items 1014 shown as "Item 1" and "Item 2" on an I/O display 1006 of the youngster's device 1002. As illustrated, the youngster's device 1002 may be shown at a location 1024 in a merchant store 1032 shown on map 1020 for illustrative purposes. Further, the merchant stores 1028, 1030, 1032, and/or 1034 may be proximately located to one another. Yet further, a client device 1004, possibly also referred to as a remote device that takes the form of a parent's smartphone shown at a location 1026 inside of the merchant store 1034.

In some embodiments, the youngster's request 1010 to purchase the one or more items 1014 may include a first description of the first item ("Item 1"), a second description of a second item ("Item 2"), and an indication of a total cost of the one or more items 1014. As shown, the server device may transmit the generated electronic message 1016 to the parent's device 1004. In particular, an I/O interface 1008 of the parent's device 1004 may display the user account 1012 that may, for example, include a family account such as those described above. Yet further, the I/O interface 1008 may display the electronic message 1016 with a question, "Authenticate User Request 1010?" As such, user data 1018 may provide selections, "Yes," "No," and "More Details." Thus, by selecting "Yes," the youngster's request 1010 to purchase the one or more items 1014 may be processed. Further, by selecting "No," the youngster's request 1010 may be declined such that the one or more items 1014 are not purchased under the family account 1012. Yet further, by selecting "More Details," various details of the youngster's request 1010 may be viewed such as, for example, the descriptions of the first and second items including images of each of the items, the total cost to purchase the first and second items, among additional details (e.g., size, dimensions, waist, and/or length) associated with purchasing items 1 and 2.

In some embodiments, the youngster's device 1002 may be a second user device associated with the family account 1012, possibly among other devices associated with the family account 1012. For example, a son, daughter, nephew, niece, cousin, uncle, and/or aunt, may each have a smartphone associated with the family account 1012 to initiate requests to purchase items that may be viewed, authenticated, and/or approved by the parent's device 1004. In some instances, the method 900 described above may include determining a threshold radius 1038 of a circle 1036 around the parent's device 1004. Further, the method may include determining the youngster's device 1002 is at the location 1024 within the threshold radius 1038 of the parent's device 1004. In some instances, the method may include transmitting the generated electronic message 1016 to the parent's device 1004 based on at least the youngster's device being within the threshold radius 1038 from the parent's device 1004.

In some embodiments, determining the threshold radius 1038 of the parent's device 1004 may include determining or identifying user preferences of the family account 1012, possibly indicating the threshold radius 1038 around the parent's device 1004. For example, the parent may be able to set the radius 1038 to be one or more distances and enter such distances as the parent's preferences, possibly stored with the family account 1012. In particular, consider a scenario such that the youngster's device 1002 moves to the merchant store 1028 outside of the threshold radius 1038. If the youngster attempts to create a request to purchase one or more items from the merchant store 1028, the request may be denied because the youngster's device 1002 is outside of the threshold radius 1038. It should also be noted that the parent may also be able to select specific merchant stores such as the merchant store 1032 limiting where the youngster may be able to create requests to purchase items. Thus, if the youngster attempts to create a request from one of the stores 1028 and/or 1030, the request may be denied because the youngster's device is limited to creating requests from the stores 1032 and/or 1034.

In some embodiments, one or more of the methods described above may include determining the user data received by the server device includes authentication data such as those described above. Further, the methods may include determining a successful authentication of the user request to purchase the one or more items based on the authentication data. Yet further, the methods may include processing the user request 1010 to purchase the one or more items 1014 based on the successful authentication. In some embodiments, the method may also include causing the user device 1004 to display the generated electronic message, where the user device 1004 includes or takes the form a wearable computing device.

Figure 11:
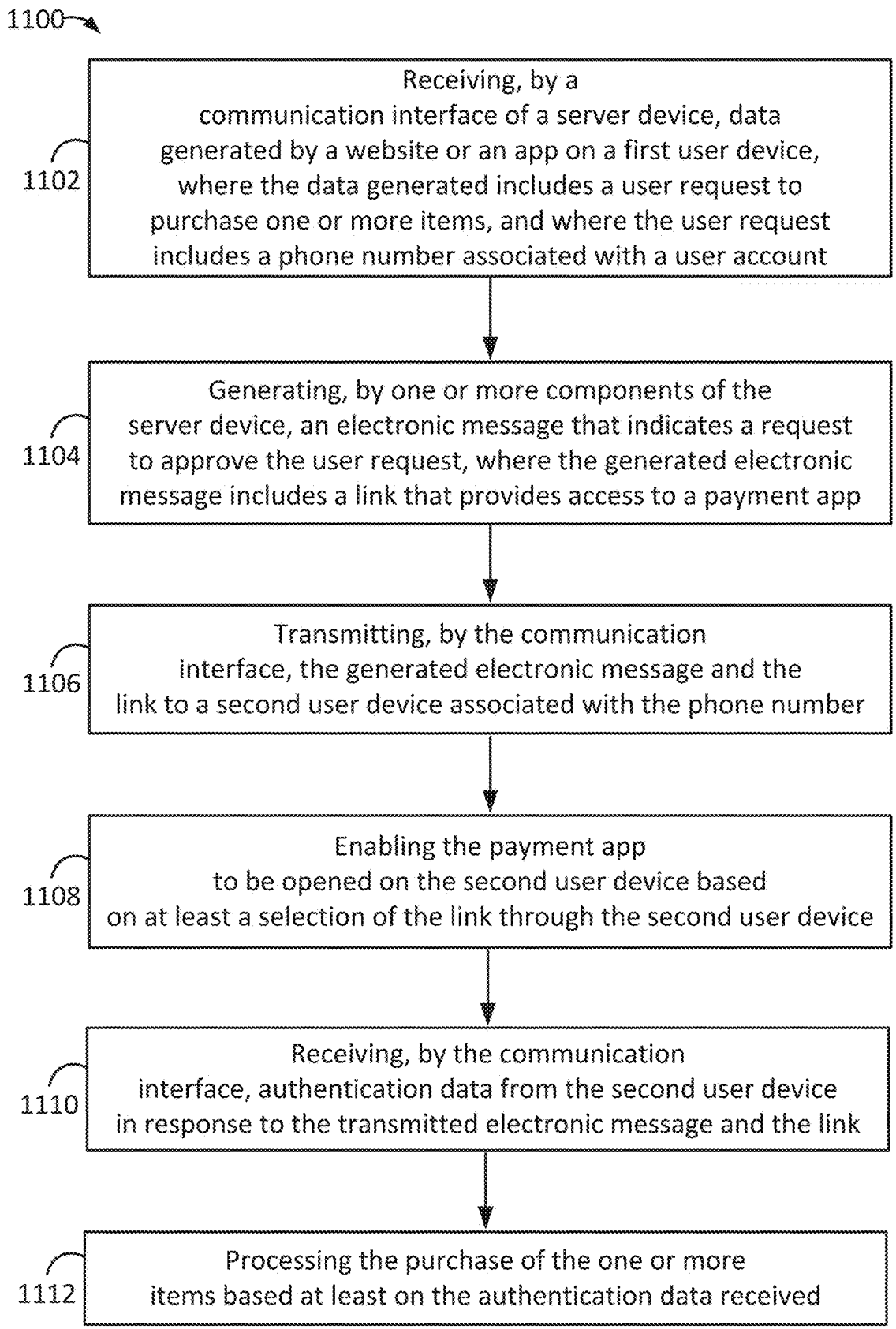
FIG. 11 is a flowchart of an exemplary method, according to an embodiment.

FIG. 11 is a flowchart of an exemplary method 1100, according to an embodiment. Notably, one or more steps of the method 1100 or other methods/processes described herein may be omitted, performed in a different sequence, and/or combined with those of the method 900 described above for various types of applications.

At step 1102, the method 1100 may include receiving, by a communication interface of a server device, data generated by a website or an app on a first user device. Referring back to FIG. 10, the data generated may include the user request 1010 to purchase the one or more items 1014. Further, the user request 1010 may include a phone number associated with the user account 1012. For example, the phone number may be one that may be used to contact the user device 1004.

At step 1104, the method 1100 may include generating, by one or more components of the server device, an electronic message that indicates a request to approve the user request. For example, the electronic message 1016 may indicate a request to approve the user request 1010. Further, the generated electronic message 1016 may include a link such as a URL link that provides access to a payment app on the user device 1004.

At step 1106, the method 1100 may include transmitting, by the communication interface, the generated electronic message and the link to the second user device associated with the phone number. For example, the generated electronic message 1016 and the link may be transmitted to the second user device 1004 associated with the phone number. In some instances, the link may be included, embedded, and/or combined with the words of the generated electronic message 1016. In particular, the link may be embedded in the words, "Authenticate User Request 1010." Further, in some instances, the link may be provided separately, shown with the words "payment provider link," for instance.

At step 1108, the method 1100 may include enabling the payment app to be opened on the second user device based on at least a selection of the link through the second user device. For example, the payment app may be enabled or opened on the second user device 1004 based on the user (e.g., the parent) selecting the link through the second user device 1004.

At step 1110, the method 1100 may include receiving, by the communication interface, authentication data from the second user device in response to the transmitted electronic message and the link. For example, the authentication data received from the second user device 1004 may include authentication data such as those described above in relation to FIGS. 5A-5D.

At step 1112, the method 1100 may include processing the purchase of the one or more items based at least on the authentication data received. For example, the purchase of the one or more items 1014 may be processed based on the authentication data received from the second user device 1004.

In some embodiments, the user request 1010 to purchase the one or more items 1014 may include a description of each of the one or more items 1014 and an indication of a total cost of the one or more items 1014 as described above. In some embodiments, the first user device 1002 and the second user device 1004 are identified by the user account 1012, possibly where the user account 1012 is a family account as described above.

In some embodiments, the method 1100 may include determining the threshold radius 1038 of the second user device 1004 or a location 1026 of the second user device 1004. Further, the method 1100 may include determining the first user device 1002 is within the threshold radius 1038 of the second user device 1004. Yet further, the method 1100 may include transmitting the generated electronic message 1016 to the second user device 1004 based on the first user device 1002 being within the threshold radius 1038 of the second user device 1004, possibly as described above.

In some embodiments, determining the threshold radius 1038 of the second user device 1004 may include determining user preferences of the user account 1012 indicating the threshold radius 1038 of the second user device 1004. In some embodiments, the method 1100 may include determining a successful authentication of the user request 1010 to purchase the one or more items 1014 based on the authentication data. Further, the method 1100 may include processing the user request 1010 to purchase the one or more items 1014 based on at least the successful authentication. In some instances, the method 1100 may include causing the second user device 1004 to display the generated electronic message 1016, where the second user device 1004 takes the form of a wearable computing device.

Figure 12A:
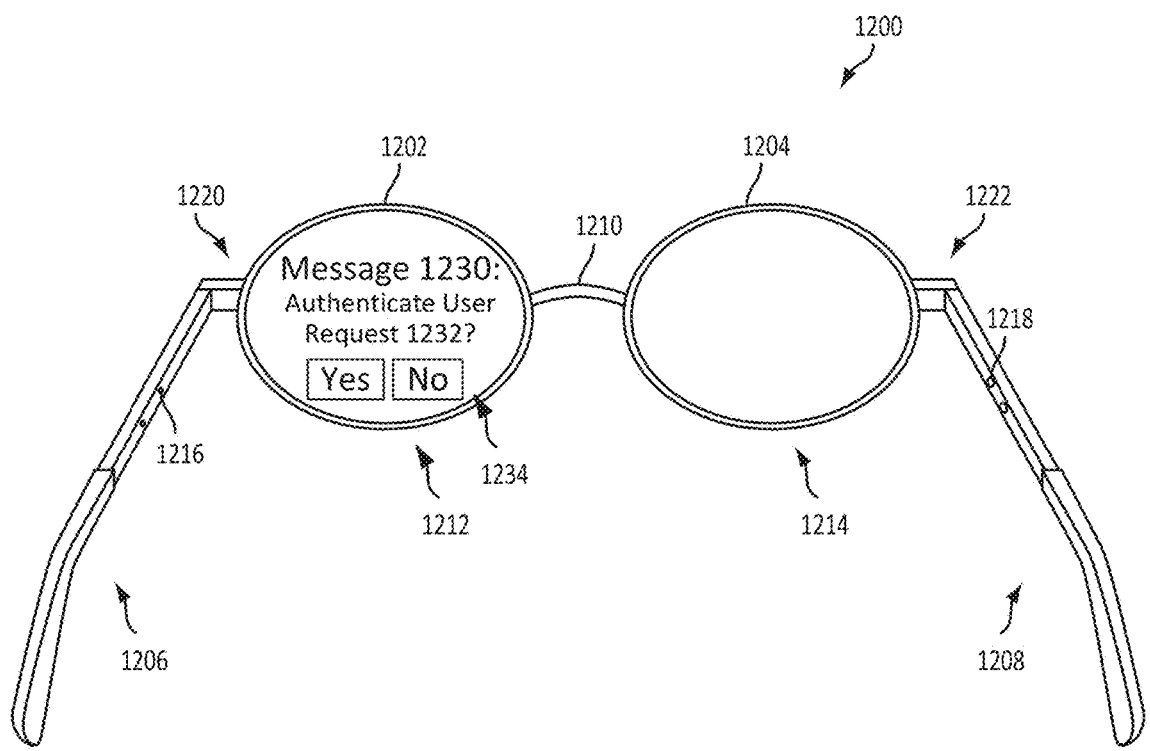
FIGS. 12A and 12B illustrate an exemplary wearable computing device, according to an embodiment.
Figure 12B:
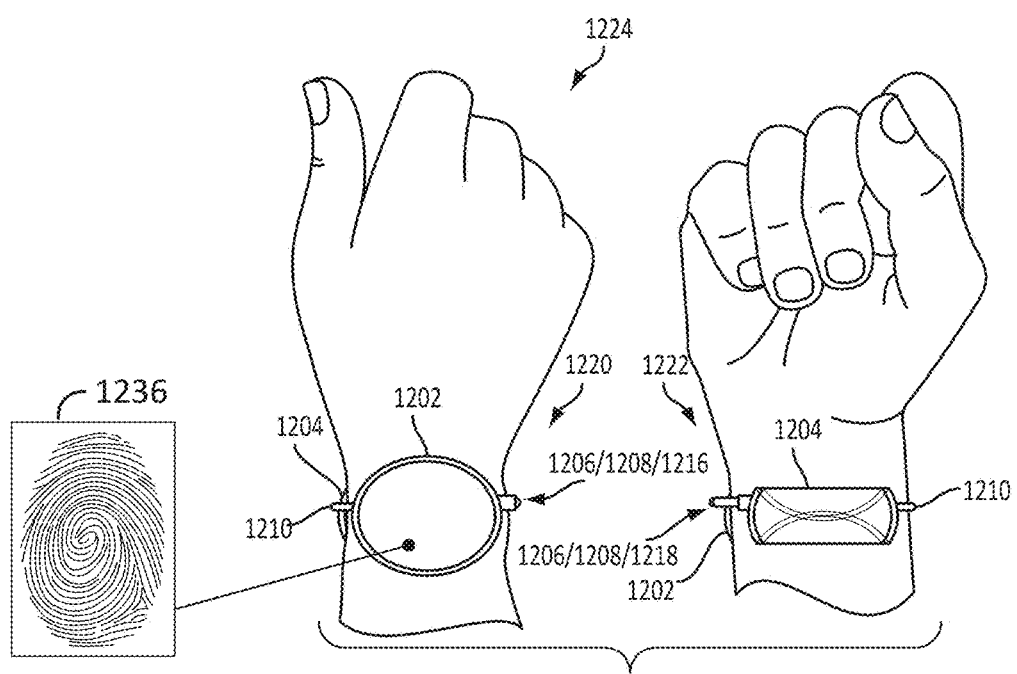

FIGS. 12A and 12B illustrate an exemplary wearable computing device 1200, according to an embodiment. As illustrated, the wearable computing device 1200 may take the form of a head-mountable display (HMD) and/or an arm or wrist-mountable display. As shown in FIG. 12A, the wearable computing device 1200 may be wearable as a HMD device. The device 1200 may include lenses 1202 and 1204. The device 1200 may also include a side component 1206, a side component 1208, and a middle component 1210. For example, the device 1200 may be mountable on a user's head such that the side component 1206 rests on one ear of the user and the side component 1208 rests on the other ear of the user. Further, the middle component 1210 may rest on the nose of the user. In some instances, the lenses 1202 and 1204 may be positioned in front of the user's eyes. Further, the lenses 1202 and 1204 may include displays 1212 and 1214, respectively. In some instances, the displays 1212 and 1214 may be transparent, partially see-through, and/or configured to provide an augmented reality. Further, the displays 1212 and/or 1214 may include touch pad displays to display data and receive touch inputs such that the user can manipulate graphics provided by the displays 1212 and/or 1214. The lenses 1202 and/or 1204 may also include scanners such as laser scanners configured to scan the eyes of the user to retrieve biometric inputs based on the user's eyes, retinas, and/or irises, possibly for authenticating the user's account.

As shown, the display 1212 may provide an electronic message 1230, possibly similar to those described above in relation to FIGS. 1-10. As such, a question may be displayed, "Authenticate User Request 1232?" Further, user data 1232 may provide selections, "Yes" and "No." Thus, by selecting "Yes," possibly through verbal command or a touch selection input, the user request 1232 to purchase one or more items may be processed. Further, by selecting "No," possibly through a verbal command or a touch selection input, the user request 1232 may be declined such that the one or more items may not be purchased under the user's account.

As shown in FIG. 12B, the wearable computing device 1200 may also be wearable as an arm/wrist-mountable device. Yet, the wearable computing device 1200 may take the form of a bracelet, an anklet, and/or a necklace, among other forms of accessories. As shown, the side components 1206 and 1208, the middle component 1210, and/or the lenses 1202 and 1204 may be adjustable to fit on an arm and/or wrist 1224 of a user. As shown, the lens 1202 may be positioned on the top of the wrist 1224 to operate as the face of a wrist watch. The side components 1206, 1208, and/or the middle component 1210 may be adjusted to fit around the wrist 1224. The lens 1204 may be positioned on the bottom of the wrist 1224. As shown, the lens 1204 may be flexible, foldable, and/or retractable, among other ways to adjust into the form of a wrist-watch band.

The wearable computing device 1200 may include one or more sensors 1216 and/or 1218 configured to receive a number of inputs associated with the user. The one or more sensors 1216 and/or 1218 may also include accelerometers, gyroscopes, compasses, barometers, capacitive sensors, haptic sensors, temperature sensors, ambient light sensors, sound sensors, image sensors, biometric sensors, moisture sensors, electrodes, and/or chemical sampling sensors, among other types of sensors to receive inputs from the user. For example, based on the way the wearable computing device 1200 is worn as a head-mountable device or an arm/wrist-mountable device, the sensors 1216 and/or 1218 may be configured to receive inputs directly and/or indirectly from the user.

In some embodiments, the lens 1202 may include a sensor that may, for example, include a capacitive sensor and/or proximity sensor to sense, detect, and/or identify the user of the device 1200. Further, the sensor may include a biometric sensor such as a fingerprint sensor. Thus, the fingerprint sensor may receive one or more fingerprint inputs from user, possibly to authenticate the user request 1232. In particular, the fingerprint sensor may receive the fingerprint data 1236 to authenticate the user request 1232 and/or process the user request 1232.

The present disclosure, the accompanying figures, and the claims are not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in faun and detail without departing from the scope of the present disclosure.

What is claimed is:
1. A system, comprising:
a non-transitory memory; and
one or more hardware processors coupled to the non-transitory memory and configured to read instructions from the non-transitory memory to cause the system to perform operations comprising:

receiving, from a first device, a payment transaction request for purchasing one or more items from a merchant, wherein the payment transaction request comprises a device identifier of a second device associated with a user account with a service provider without including a password, a PIN number, or biometric data associated with the user account;

causing the second device to launch an application associated with the service provider based on the device identifier included in the payment transaction request;

detecting that the application has been accessed by a user of the second device;

receiving, via a user interface of the application on the second device, credentials associated with the user account;

determining whether a time between the detecting and the receiving the credentials is within a duration threshold;

authorizing the payment transaction request in response to determining that the time between the detecting and the receiving the credentials is within the duration threshold; and processing a payment associated with the payment transaction request using the user account without transmitting funding data to the merchant or the first device.

2. The system of claim 1, wherein the first device is a point-of-sale device associated with the merchant.

3. The system of claim 1, wherein the first device is a user device associated with the user, and wherein the payment transaction request is received via a webpage associated with the merchant displayed on the first device.

4. The system of claim 1, wherein the credentials received from the second device comprises at least one of the password, the PIN number, or the biometric data associated with the user account.

5. The system of claim 1, wherein the operations further comprise:
transmitting a message to the second device in response to receiving the payment transaction request.

6. The system of claim 5, wherein the message comprises a link, and wherein a selection of the link causes the application to launch on the second device.

7. The system of claim 1, wherein the operations further comprise transmitting a notification indicating that the payment associated with the payment transaction request has been processed.

8. A method comprising:
receiving, from a first device, a payment transaction request for purchasing one or more items from a merchant, wherein the payment transaction request comprises a device identifier of a second device associated with a user account with a service provider without including credentials associated with the user account;
activating an application associated with the service provider on the second device;
detecting that the application has been accessed by a user of the second device;
receiving, via a user interface of the application on the second device, the credentials associated with the user account;
determining whether a time between the detecting and the receiving the credentials is within a duration threshold; and in response to determining that the time between the detecting and the receiving the credentials is within the duration threshold, processing a payment associated with the payment transaction request using the user account without transmitting funding data to the merchant or the first device.

9. The method of claim 8, further comprising identifying the user account based on the device identifier of the second device.

10. The method of claim 8, further comprising:
presenting, on the user interface of the application, information associated with the payment transaction request.

11. The method of claim 8, further comprising initiating a timer in response to the detecting that the application has been accessed by a user of the second device, wherein the time is determined based on the timer.

12. The method of claim 8, further comprising:
transmitting a push notification to the second device in response to receiving the payment transaction request.

13. The method of claim 8, further comprising:
authenticating the user of the second device based on the credentials received via the user interface of the application, wherein the payment is processed in response to the authenticating the user.

14. The method of claim 8, further comprising:
presenting, on the user interface of the application, information associated with the one or more items.

15. A non-transitory machine-readable medium having stored thereon machine-readable instructions executable to cause a machine to perform operations comprising:
receiving, from a first device, a payment transaction request for purchasing one or more items from a merchant, wherein the payment transaction request comprises a device identifier of a second device associated with a user account with a service provider different from the merchant without including credentials for logging in to the user account;
causing the second device to activate an application associated with the service provider based on the device identifier included in the payment transaction request;
detecting that the application has been accessed by the user of the second device;
receiving, via a user interface of the application on the second device, the credentials associated with the user account;
determining whether the credentials are received within a duration threshold from the detecting that the application has been accessed by the user;
authenticating the user based on the credentials; and
in response to the authenticating the user, processing a payment associated with the payment transaction request using the user account without transmitting funding data to the merchant or the first device.

16. The non-transitory machine-readable medium of claim 15, wherein the operations further comprise:
determining a first location of the first device is within a distance threshold of a second location of the second device, wherein the payment is processed is further based on the determining that the first location of the first device is within the distance threshold of the second location of the second device.

17. The non-transitory machine-readable medium of claim 15, wherein the second device is a wearable device.

18. The non-transitory machine-readable medium of claim 15, wherein the operations further comprise:

transmitting a message to the second device in response to receiving the payment transaction request.

19. The non-transitory machine-readable medium of claim 18, wherein a selection of the message causes the second device to activate the application.

20. The non-transitory machine-readable medium of claim 15, wherein the operations further comprise transmitting a notification indicating that the payment associated with the payment transaction request has been processed.

* * * * *